US008260062B2

(12) United States Patent
Chen et al.

(10) Patent No.: US 8,260,062 B2
(45) Date of Patent: Sep. 4, 2012

(54) SYSTEM AND METHOD FOR IDENTIFYING DOCUMENT GENRES

(75) Inventors: Francine R. Chen, Menlo Park, CA (US); Yijuan Lu, San Marcos, TX (US); Matthew Cooper, San Francisco, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 512 days.

(21) Appl. No.: 12/437,526

(22) Filed: May 7, 2009

(65) Prior Publication Data

US 2010/0284623 A1 Nov. 11, 2010

(51) Int. Cl.
*G06K 9/62* (2006.01)
*G06K 9/46* (2006.01)
*H04N 1/36* (2006.01)
*G06F 12/00* (2006.01)

(52) U.S. Cl. ........ 382/224; 382/225; 382/228; 382/159; 382/190; 382/173; 358/403; 358/404; 707/821

(58) Field of Classification Search .................. 382/276, 382/305–306, 181, 190, 200, 159–160, 173, 382/175–176; 707/821–831; 358/403–404
See application file for complete search history.

(56) References Cited

U.S. PATENT DOCUMENTS

| | | | | |
|---|---|---|---|---|
| 5,526,443 A * | 6/1996 | Nakayama | ..................... | 382/229 |
| 5,943,443 A * | 8/1999 | Itonori et al. | ................. | 382/225 |
| 5,999,664 A * | 12/1999 | Mahoney et al. | ............ | 382/305 |
| 6,185,560 B1 * | 2/2001 | Young et al. | .................. | 707/776 |
| 6,456,738 B1 * | 9/2002 | Tsukasa | ......................... | 382/175 |
| 6,542,635 B1 * | 4/2003 | Hu et al. | ........................ | 382/173 |
| 6,751,354 B2 * | 6/2004 | Foote et al. | .................... | 382/224 |
| 7,039,856 B2 * | 5/2006 | Peairs et al. | ................... | 715/200 |
| 7,756,341 B2 * | 7/2010 | Perronnin | ..................... | 382/224 |
| 7,912,246 B1 * | 3/2011 | Moon et al. | ..................... | 382/103 |
| 8,041,120 B2 * | 10/2011 | Zhang et al. | .................. | 382/190 |
| 2002/0122596 A1 * | 9/2002 | Bradshaw | ..................... | 382/226 |
| 2002/0138492 A1 * | 9/2002 | Kil | ................................ | 707/100 |
| 2004/0013302 A1 * | 1/2004 | Ma et al. | ....................... | 382/209 |
| 2006/0153456 A1 * | 7/2006 | Foote | ............................ | 382/190 |

(Continued)

OTHER PUBLICATIONS

Bagdanov, A., et al., "Fine-grained Document Genre Classification using First Order Random Graphs," Intelligent Sensory Information Systems, University of Amsterdam, 2001, pp. 79-83, Sep. 2001.

(Continued)

*Primary Examiner* — Chan S Park
*Assistant Examiner* — Avinash J Yentrapati
(74) *Attorney, Agent, or Firm* — Morgan, Lewis & Bockius LLP

(57) ABSTRACT

A system, a computer readable storage medium including instructions, and method for generating genre models used to identify genres of a document. For each document image in a set of document images that are associated with one or more genres, the document image is segmented into a plurality of tiles, wherein the tiles in the plurality of tiles are sized so that document page features are identifiable, and features of the document image and the plurality of tiles are computed. At least one genre classifier is trained to classify document images as being associated with one or more genres based on the features of the document images in the set of document images, the features of the plurality of tiles of the set of documents images, and the one or more genres associated with each document image in the set of documents images.

23 Claims, 23 Drawing Sheets

U.S. PATENT DOCUMENTS

| | | | |
|---|---|---|---|
| 2006/0210133 A1* | 9/2006 | Krishnan et al. | 382/128 |
| 2007/0217676 A1* | 9/2007 | Grauman et al. | 382/170 |
| 2007/0258648 A1* | 11/2007 | Perronnin | 382/224 |
| 2008/0152238 A1* | 6/2008 | Sarkar | 382/228 |
| 2008/0222093 A1* | 9/2008 | Fan et al. | 707/2 |
| 2008/0275833 A1* | 11/2008 | Zhou et al. | 706/45 |
| 2008/0310737 A1* | 12/2008 | Han et al. | 382/224 |
| 2009/0182696 A1* | 7/2009 | Menahem et al. | 706/20 |
| 2009/0204703 A1* | 8/2009 | Garofalakis et al. | 709/224 |
| 2009/0208106 A1* | 8/2009 | Dunlop et al. | 382/173 |
| 2009/0263010 A1* | 10/2009 | Zhang et al. | 382/159 |

OTHER PUBLICATIONS

Breuel, T., "High Performance Document Layout Analysis," PARC, Palo Alto, CA, USA, 10 pages, Apr. 2003.

Das Gupta, M. et al., "A Shared Parts Model for Document Image Recognition," University of Illinois, Urbana-Champaign, Palo Alto Research Center, CA, 5 pages, Sep. 2007.

Heroux, P., et al., "Classification Method Study for Automatic Form Class Identification," Laboratoire PSI, Iniversite de Rouen, 3 pages, Aug. 1998.

Huang, J., et al., "Image Indexing Using Color Correlograms," Cornell University, 7 pgs., Jun. 1997.

Kessler, B., et al., "Automatic Detection of Text Genre," Xerox Palo Alto Research Center, Dept. of Linguistics, pp. 32-38, Jul. 1997.

Kim, Y., et al., "Detecting Family Resemblance: Automated Genre Classification," Digital Curation Centre, University of Glasgow, UK, 13 pgs., Oct. 2006.

Lampert, C., et al., "Oblivious Document Capture and Real-Time Retrieval," German Research Center for Artificial Intelligence, Kaiserslautern, Germany, 8 pgs., Aug. 2005.

Levering, R., et al., "Using Visual Features for Fine-Grained Genre Classification of Web Pages," Proceedings of the 41st Hawaii International Conference on System Sciences, 2008, pp. 1-10, Jan. 2008.

Kim, Y., et al, "Examining Variations of Prominent Features in Genre Classification," Digital Curation Centre, Humanities Advanced Technology and Information Institute, University of Glasgow, UK, 10 pgs., Jan. 2008.

Peng, H., et al., "Feature Selection Based on Mutual Information: Criteria of Max-Dependency, Max-Relevance, and Min-Redundancy," IEEE Transactions on Pattern Analysis and Machine Intelligence, vol. 27, No. 8, Aug. 2005, pp. 1226-1238.

Rasiwasia, N., et al., "Scene Classification with Low-dimensional Semantic Spaces and Weak Supervision," Dept. of Electrical and Computer Engineering, University of California, San Diego, 2008, 6 pgs., Jun. 2008.

Rauber, A., et al. "Integrating Automatic Genre Analysis into Digital Libraries," Dept. of Software Technology, Vienna University of Technology, 11 pgs., Jun. 2001.

Shin, C., et al., "Classification of Document Page Images Based on Visual Similarity of Layout Structures," Language and Media Processing Laboratory, Center of Automation Research, University of Maryland, College Park, MD, 9 pgs., Jan. 2000.

Taylor, S., et al., "Classification and Functional Decomposition of Business Documents," Government Systems Group, Unisys Corporation, 1995, pp. 563-566, August.

Vijayanarasimhan, S., et al., "Keywords to Visual Categories: Multiple-Instance Learning for Weakly Supervised Object Categorization," Dept. of Computer Sciences, University of Texas at Austin, 8 pgs., Jun. 2008.

Wong, K. Y., et al., "Document Analysis System," IBM, J. Res. Develop., vol. 26, No. 6, Nov. 1982, pp. 647-656.

* cited by examiner

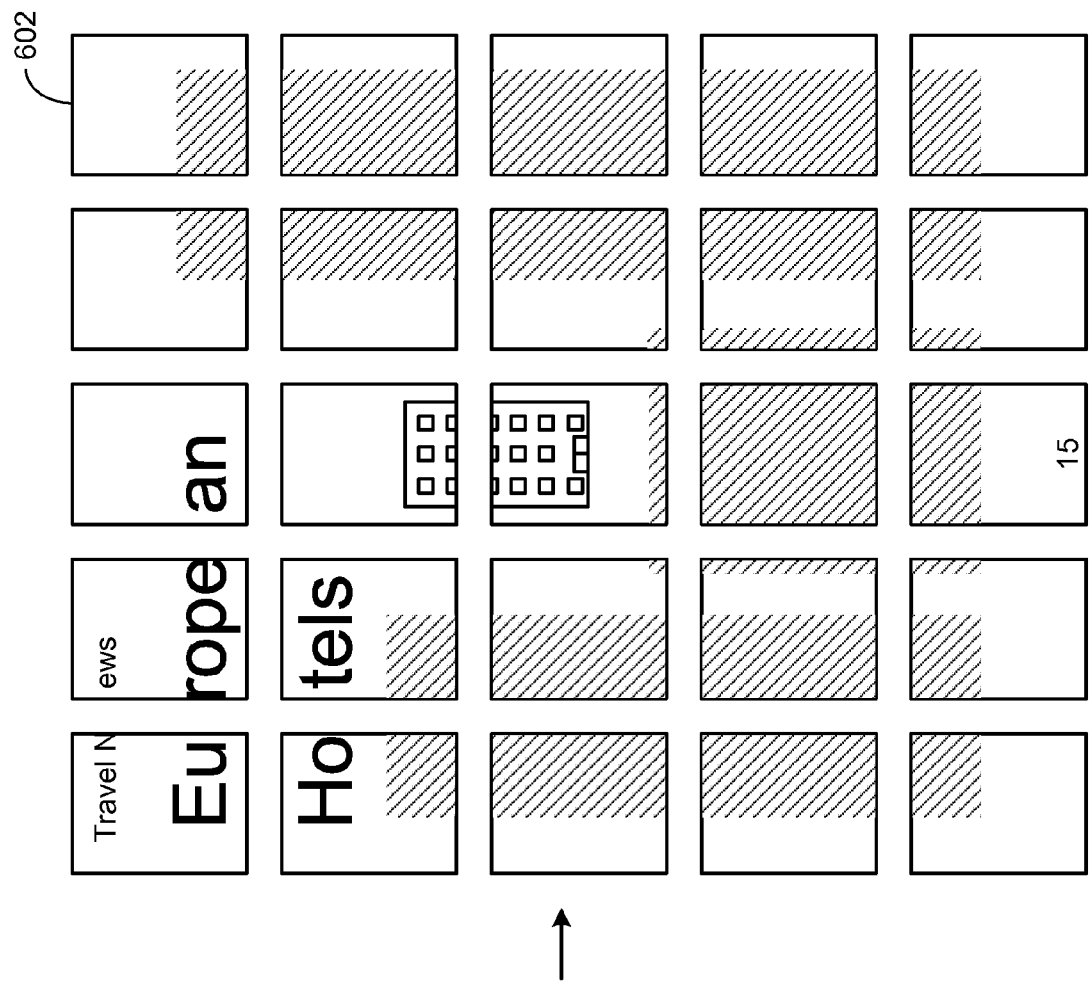
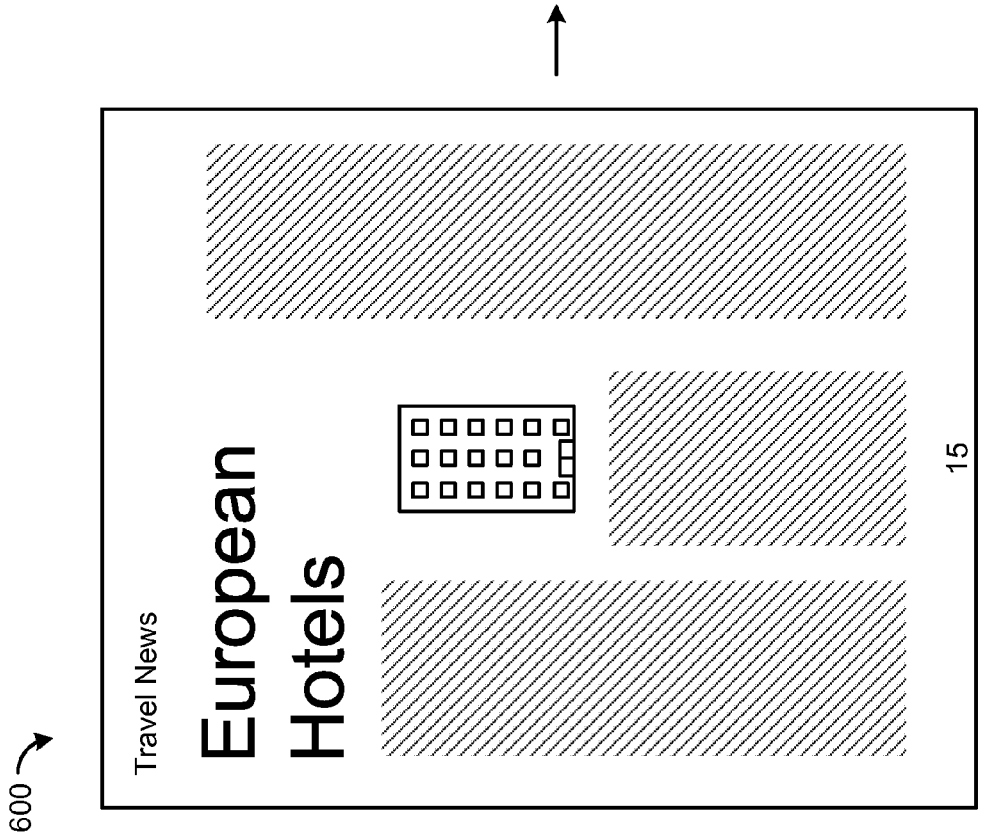
Figure 6

SYSTEM AND METHOD FOR IDENTIFYING DOCUMENT GENRES

TECHNICAL FIELD

The disclosed embodiments relate generally to classifying documents. More specifically, the disclosed embodiments relate to systems and methods for identifying document genres.

BACKGROUND

As more business is being conducted electronically, documents are increasingly being converted into electronic form. For example, documents may be scanned by a document scanner to produce an electronic document including digital images of the documents. Electronic documents are beneficial because they require less physical space then paper documents. Furthermore, electronic documents can be easily backed up to prevent accidental loss.

However, as the volume of electronic documents increases, it becomes more difficult to organize the documents. Manually organizing the documents is burdensome and inefficient. One solution to the problem is to perform optical character recognition (OCR) on the electronic documents to extract text in the electronic documents. The extracted text may then be analyzed to determine and/or classify the content of the electronic documents. For example, the content may be classified by topics (e.g., an electronic document may include information about George Washington's birthplace and therefore may be classified under the topic of "George Washington"). Unfortunately, OCR techniques are computationally expensive.

Thus, it is highly desirable to classify documents without the aforementioned problems.

SUMMARY

Some embodiments provide a system, a computer readable storage medium including instructions, and computer-implemented method for generating genre models used to identify genres of a document. For each document image in a set of document images that are associated with one or more genres, the document image is segmented into a plurality of tiles, wherein the tiles in the plurality of tiles are sized so that document page features (e.g., lines of text in a tiles, etc.) are identifiable, and features of the document image and the plurality of tiles are computed. At least one genre classifier is trained to classify document images as being associated with one or more genres based on the features of the document images in the set of document images, the features of the plurality of tiles of the set of documents images, and the one or more genres associated with each document image in the set of documents images.

In some embodiments, a first one of the at least one genre classifiers is trained to classify document images as being associated with a first genre as follows. A subset of document images is identified from the set of documents images, each document image in the subset of document images being associated with the first genre. The first genre classifier corresponding to the first genre is trained based on the features of the document images the features of the plurality of tiles associated with the document images, and information indicating which of the document images correspond to the identified subset of document images associated with the first genre. For at least a subset of the document images in the set of document images, the set of genre classifiers are applied to each of the document images and the plurality of tiles associated with the document images to produce a set of scores. For each genre, a second genre classifier corresponding to the first genre is trained to classify document images as being associated with the first genre based on the set of scores for each document image, the one or more genres associated with each document image, and a location of tiles in the plurality of tiles for each document image.

In some embodiments, a first one of the at least one genre classifiers is trained to classify a respective document image as being associated with one or more genres by performing the following operations for each genre in at least a subset of genres associated with the document images in the set of document images: (1) a subset of tiles from the set of document images is selected, wherein each tile in the subset of tiles is associated with the genre, (2) tiles in the subset of tiles are clustered based on the features of the tiles, and (3) a probability model is generated for the genre, wherein the probability model for the genre indicates a likelihood that a respective feature of a respective tile is a member of a cluster of the genre, wherein the probability model is included in a set of probability models, each of which corresponds to a genre in the subset of genres. For at least a subset of document images in the set of document images, probability models are applied to the subset of document images and the plurality of tiles associated with the subset of document images to produce a set of probabilities that respective document images in the subset of document images are members of one or more genres. The first genre classifier is trained to classify the respective document image as being associated with one or more genres based on the set of probabilities and the one or more genres associated with each document image in the subset of document images.

In some embodiments, a first one of the at least one genre classifiers is trained to classify document images as being associated with a first genre as follows. The first genre classifier corresponding to the first genre is trained based on (1) the features (e.g., document page features and tile features, as described below) of a first subset of the set of document images and (2) the features of the plurality of tiles associated with the first subset of the set of document images. Parameters of the first genre classifier are tuned using a second subset of the set of document images, wherein the first subset and the second subset of the set of document images are mutually-exclusive sets of document images. A second genre classifier corresponding to the first genre is trained based on the features of a second subset of the set of document images and the features of the plurality of tiles associated with the second subset of the set of document images. Parameters of the second genre classifier are tuned using the first subset of the set of document images.

Some embodiments provide a system, a computer readable storage medium including instructions, and computer-implemented method for identifying genres of a document. A document image of the document is received. The document image is segmented into a plurality of tiles of the document image, wherein the tiles in the plurality of tiles are sized so that document features (e.g., the number of text lines, font height, etc.) are identifiable. Features of the document image and the plurality of tiles are computed. One or more genres associated with the document image are identified based on the features of the document image and the features of the plurality of tiles.

In some embodiments, the one or more genres associated with the document image are identified based on the features of the document image and the features of the plurality of tiles of the document image as follows. A first set of genre classifiers is applied to the features of the document image and the plurality of tiles associated with the document image to produce a set of scores. A second set of genre classifiers is applied to the set of scores of the document image to identify the one or more genres associated with the document image.

In some embodiments, the one or more genres associated with the document image are identified based on the features of the document image and the features of the plurality of tiles of the document image as follows. For each genre, a likelihood that the features of the document image and the features of the plurality of tiles of the document image are members of a cluster of the genre is computed based on a probability model of the genre. A genre classifier is applied to the computed likelihoods to identify the one or more genres associated with the document image.

In some embodiments, the one or more genres associated with the document image are identified based on the features of the document image and the features of the plurality of tiles of the document image as follows. A first set of genre classifiers is applied to the features of the document image and the plurality of tiles associated with the document image to produce a first set of scores. A second set of genre classifiers is applied to the features of the document image and the plurality of tiles associated with the document image to produce a second set of scores. The first set of scores and the second set of scores are combined to produce a combined set of scores. The one or more genres associated with the document image are identified based on the combined set of scores.

BRIEF DESCRIPTION OF THE DRAWINGS

FIG. 6 is a block diagram illustrating the process of segmenting a document image into a plurality of tiles, according to some embodiments.

Like reference numerals refer to corresponding parts throughout the drawings.

DESCRIPTION OF EMBODIMENTS

Figure 1:
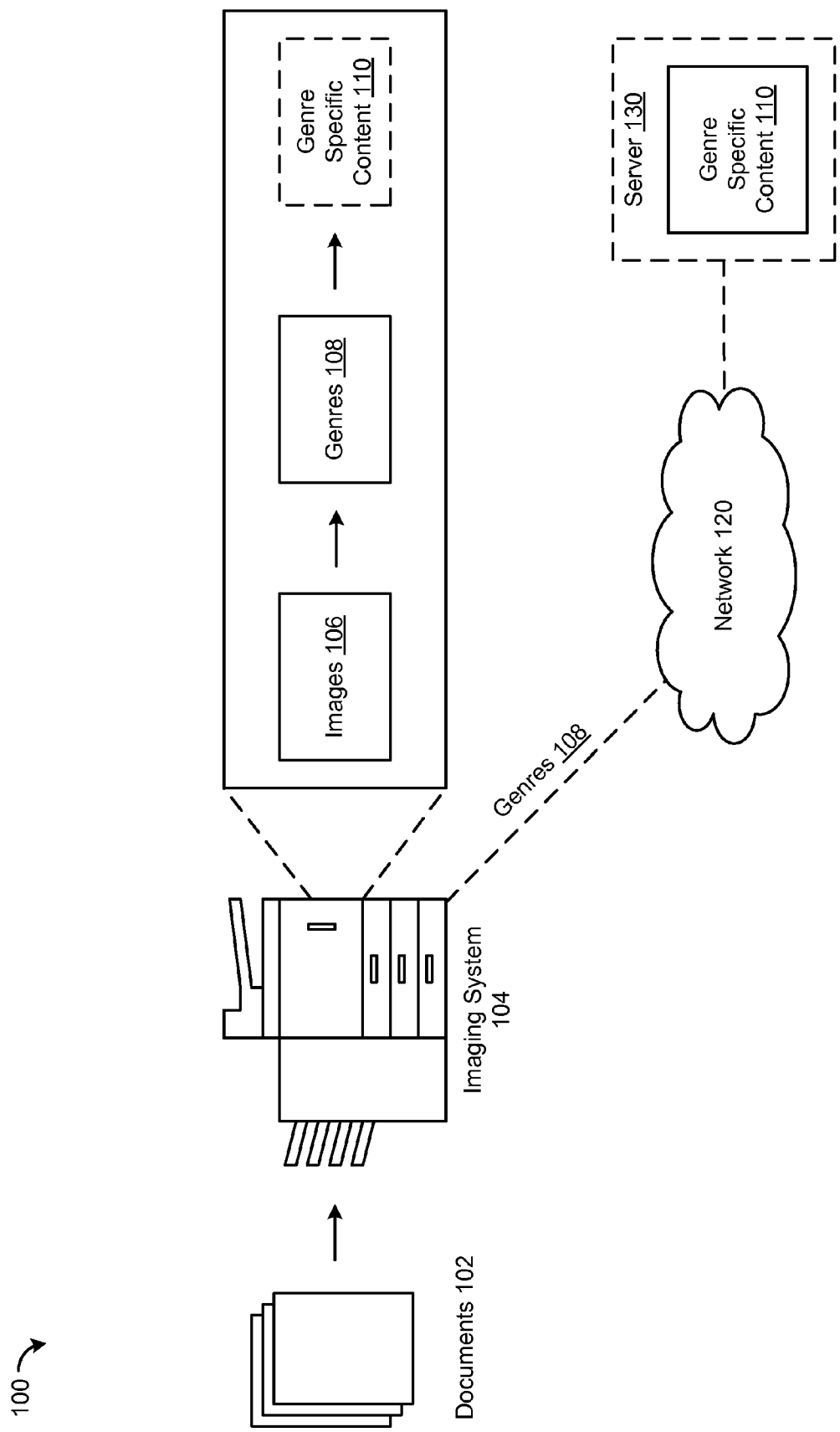
FIG. 1 is a block diagram illustrating an imaging system, according to some embodiments.

As discussed above, documents are often classified according to topics. However, there are other techniques of classifying documents that provide useful information (e.g., metadata) that may be used when indexing, organizing, searching for, or displaying contents (e.g., ads) based on scanned documents. For example, genres may be used to classify documents. Thus, in some embodiments, documents are classified by genres. Genres may include: advertisements, brochures, casual papers (e.g., newsletters, magazine articles, etc.), flyers, forms, maps, formal papers (e.g., journal papers, etc.), photos, receipts, rules and regulations, reports, resumes, tables, etc. In some embodiments, the documents are indexed by both topic and genre. For example, if documents are indexed by both topic and genre, then a tourist may, for example, search for brochures about geysers in Yellowstone, while a science student may search for papers about geysers in Yellowstone. Similarly, during advertisement placement, if it is recognized that a brochure is being scanned, and the brochure has words such as "Hawaii," "sand," and "island," then advertisements for tourist services in Hawaii or travel agents specializing Hawaiian vacations may be presented to the user scanning the brochure.

In some embodiments, genres may be characterized by "style," "form," and "content." "Style" corresponds to the structural content, such as the use of punctuation, sentences, and phrases. For example, an editorial has a different style than formal prose, which in turn has a different style than poetry. "Form" includes the structural layout of a document, such as location and number of columns, headings, graphs, and font size. For imaged/scanned documents, form is usually identified using structural layout analysis (e.g., see T. Breuel, "High Performance Document Layout Analysis," Proc. Symposium on Document Image Understanding Technology, 2003, which is hereby incorporated by reference in its entirety). "Content" refers to the meaning or semantic values in a document, such as the presence of terms and objects in the document.

In some embodiments, genre identification based on features from different modalities (e.g., style, form, and content) is used. These embodiments may be used when computation time and/or complexity is not an issue. However, when computational time and/or complexity are constraints, it is desirable to reduce the modalities used. Thus, in some embodiments, genres associated with an imaged document are based on "form." In these embodiments, image-based features that can be computed relatively efficiently and relatively robustly are used. Furthermore, layout analysis is not performed. The imaged documents may be captured from hardware such as a document scanner, camera, video camera, facsimile machine, copier, etc. In the case of a camera or video camera, if the image contains other objects in the background, the image may be preprocessed to identify the portion of the image that includes a document page image (e.g., see C. H. Lampert, T. Braun, A. Ulges, D. Keysers, and T. M. Breuel, "Oblivious document capture and realtime retrieval", Proc. CBDAR2005, pp. 79-86, 2005, for a discussion on preprocessing images). In some embodiments, the classification system described herein may also include "style" and "content" type features. These embodiments may require the use of OCR.

In some embodiments, image features are used to identify genres associated with documents. In these embodiments, the underlying, or latent, types of page regions are identified. These latent types of page regions intuitively correspond to types such as text, photo, column, large font, rules, etc. In some embodiments, Gaussian mixture models are used to assign region label probabilities that correspond to the probability that a given region is of a given latent type (e.g., see N. Rasiwasia and N. Vasconcelos, "Scene classification with low-dimensional semantic spaces and weak supervision," Proc. IEEE Conference on Computer Vision and Pattern Recognition, Anchorage, June 2008, for an overview on Gaussian mixture models, which is hereby incorporated by reference in its entirety). The region label probabilities are then used as inputs to a classifier that is trained to identify genres of a document.

Genre identification may be performed by a genre-identification system as described herein. In some embodiments, the genre-identification system addresses one or more of the following issues:

(1) a document may be classified as more than one genre (e.g., an invitation that is to be posted on a bulletin board may be classified as both an invitation and a flyer),
(2) each genre may have different forms (e.g., maps may be in color or black and white, some may have accompanying text descriptions and/or a legend, etc.), and
(3) documents often are composed of multiple pages where each page of a document may be composed of different types of image regions, and the pages may have different types on different pages (e.g., some pages of a paper may contain graphs or images, while others are purely text).

In some embodiments, to address the first issue, the genre-identification system described herein uses "one-against-many" classifiers. That is, for each genre to be identified, a separate classifier is trained to discriminate that genre from all other genres. In some embodiments, to address the second issue, the genre-identification system uses the concept of latent spaces, which correspond to types of document regions (e.g., body text, title text, etc.). In some embodiments, to address the third issue, a classifier that combines the identified genres for each page of a document (e.g., via multiple instance learning or voting) is used. The different page regions may be handled by the use of a latent space.

FIG. 1 is a block diagram 100 illustrating an imaging system 104, according to some embodiments. In some embodiments, the imaging system 104 receives documents 102 and produces images 106. For example, the imaging system 104 may scan the documents and produce digital images. This specification uses the term "document image" to refer to an image of a page of a document for a multi-page document, and to refer to an image of the document for a single page document. The documents 102 may include content of one or more genres 108. For example, the one or more genres 108 may include advertisements, brochures, casual papers (e.g., newsletters, magazine articles, etc.), flyers, forms, maps, formal papers (e.g., journal papers, etc.), photos, receipts, regulations/rules, reports, resumes, and tables.

In some embodiments, a classification system identifies the one or more genres 108 associated with the images 106 corresponding to the documents 102. The classification system may be included in the imaging system 104 or may be located on a separate device (e.g., a server, etc.). If the classification system is located on a separate device, the images 106 may be transmitted to the separate device through a network (e.g., network 120). Alternatively, the images 106 may be delivered to the separate device using physical media (e.g., CD ROMs, DVDs, flash drives, floppy disks, hard disks, etc.). The classification system is described in more detail with respect to FIGS. 3A-3C, 4A-4C, 5B, 5D, and 5F.

In some embodiments, the one or more genres 108 are used to display genre specific content 110 on a display device of the imaging system 104. For example, if the one or more genres 108 associated with the images 106 include resumes, the genre specific content 110 may include advertisements for job websites or contact information for recruiters.

In some embodiments, the imaging system 104 queries a server 130 via a network 120 using the one or more genres 108 to obtain the genre specific content 110 from the server 130. The network 120 can generally include any type of wired or wireless communication channel capable of coupling together computing nodes. This includes, but is not limited to, a local area network, a wide area network, or a combination of networks. In some embodiments, the network 120 includes the Internet.

In some embodiments, the imaging system 104 includes an imaging device such as a copier, a scanner, a facsimile machine, a digital camera, a camcorder, and a mobile phone. In these embodiments, the imaging device produces a digital image of the document.

In some embodiments, the one or more genres 108 are used to tag the documents 102 (e.g., using metadata). These tags may then be used filter and/or sort the documents 102 (e.g., via a query against the tags). Furthermore, tags may be used to organize and/or file the documents 102 (e.g., placing the documents 102 in specified folders, etc.).

In some embodiments, prior to using the classification system, genre classifiers of the classification system are trained on a training system during a training phase using a set of training documents. The set of training documents may already be tagged with one or more genres. Alternatively, the set of training documents may be untagged. In this case, the set of training documents are manually tagged (e.g., by a user, etc.) during the training phase. The training system is described in more detail with respect to FIGS. 2A-2C, 4A-4C, 5A, 5C, and 5E. Note that the term "genre-identification system" refers to a system that includes a training system and a classification system, as described herein.

Three training and classification techniques are described below. The first technique is described with respect to FIGS. 2A, 3A, 4A, 5A, and 5C. The second technique is described with respect to FIGS. 2B, 3B, 4B, 5B, and 5D. The third technique is described with respect to FIGS. 2C, 3C, 4C, 5E, and 5F.

Figure 2A:
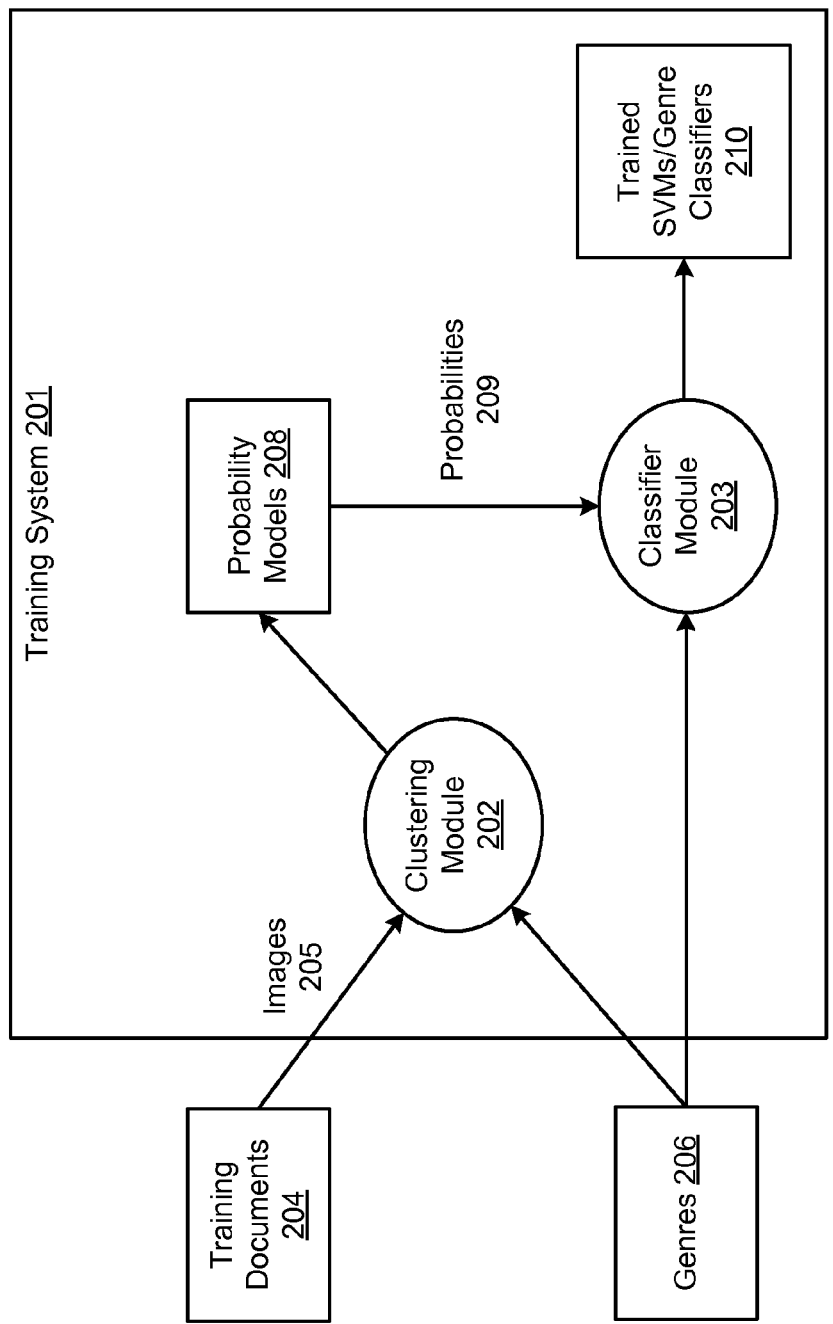
FIG. 2A is a block diagram illustrating a training system, according to some embodiments.

Attention is now directed to the first training and classification technique. FIG. 2A is a block diagram 200 illustrating a training system 201, according to some embodiments. In these embodiments, a clustering module of the training system 201 receives the training documents 204 and the associated genres 206. Each document in the training documents 204 may be associated with one or more genres. The associations may be specified in metadata of each document, may be specified in a separate document (e.g., an XML file, a text file, etc.), or database that associates each training document with one or more genres. The clustering module 202 uses the features extracted from the training documents 204 and the associated genres 206 to produce probability models 208. The probability models 208 generate probabilities 209 that are used by a classifier module 203 to train a trained support vector machines (SVMs)/genre classifiers 210, which are described in more detail with respect to FIGS. 4A and 5A. Note that a SVM is a set of supervised learning techniques that may be used to classify data. In some embodiments, the training system includes an imaging device that scans the training documents 204 to produce images 205 of the training documents 204. The images 205 of the training documents 204 are then used by the training system 201. In some embodiments, the training documents 204 are already images of documents and are used directly by the training system 201.

Note that the term genre classifier and support vector machine (SVM) are used interchangeably in this specification to refer to a classifier that can identify genres of document images as described herein.

Figure 2B:
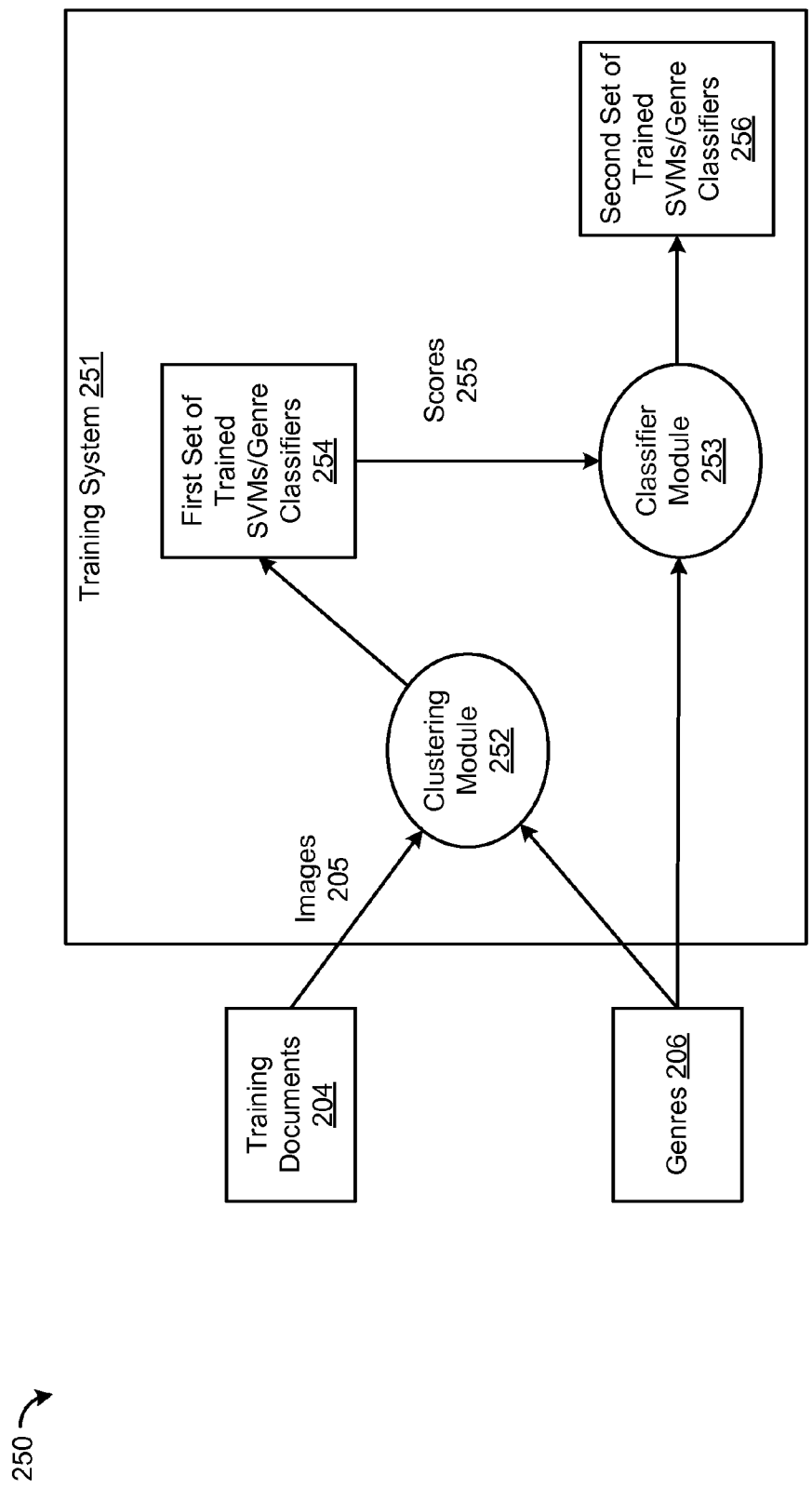
FIG. 2B is a block diagram illustrating another training system, according to some embodiments.
Figure 2C:
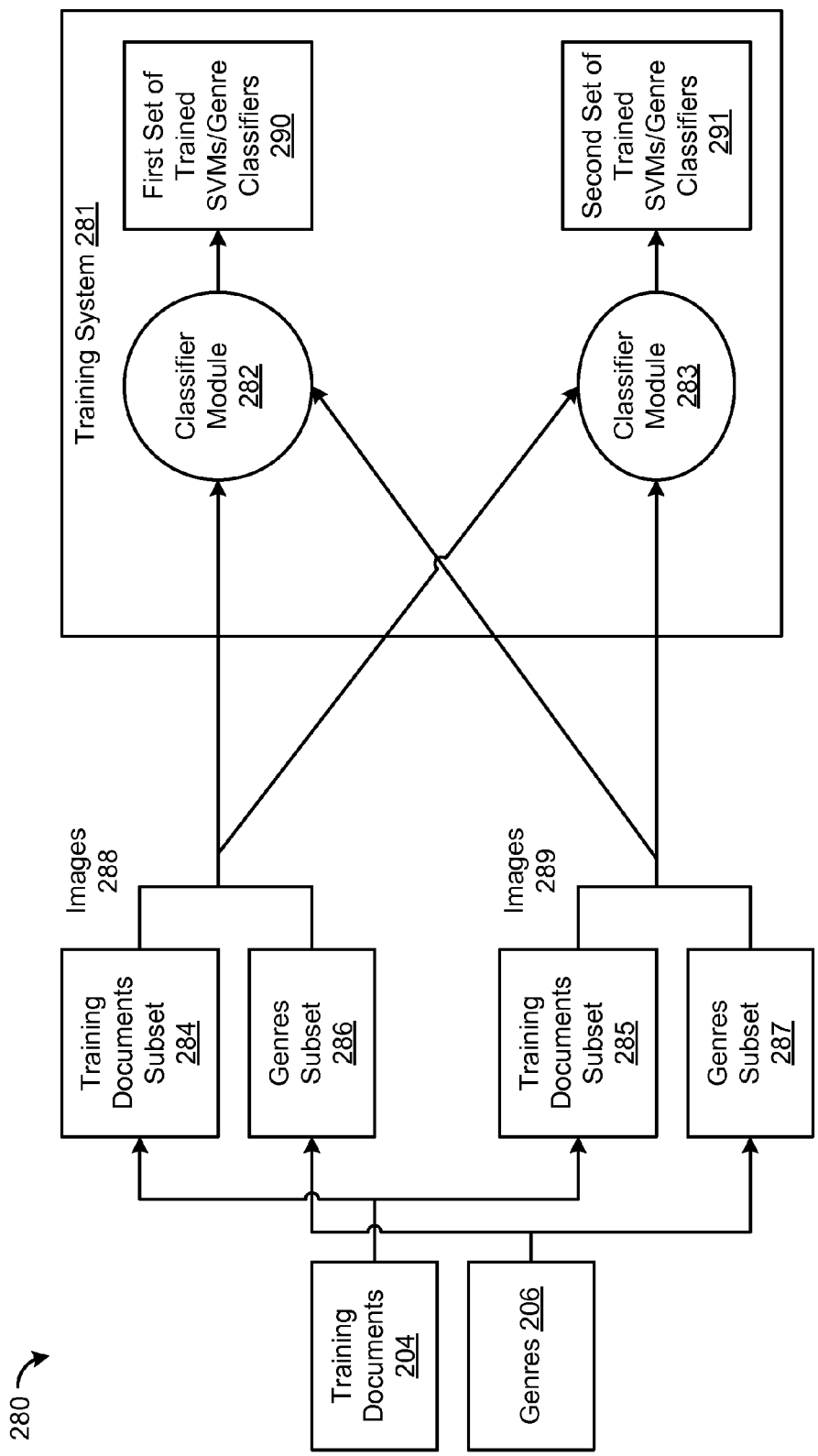
FIG. 2C is a block diagram illustrating another training system, according to some embodiments.
Figure 3A:
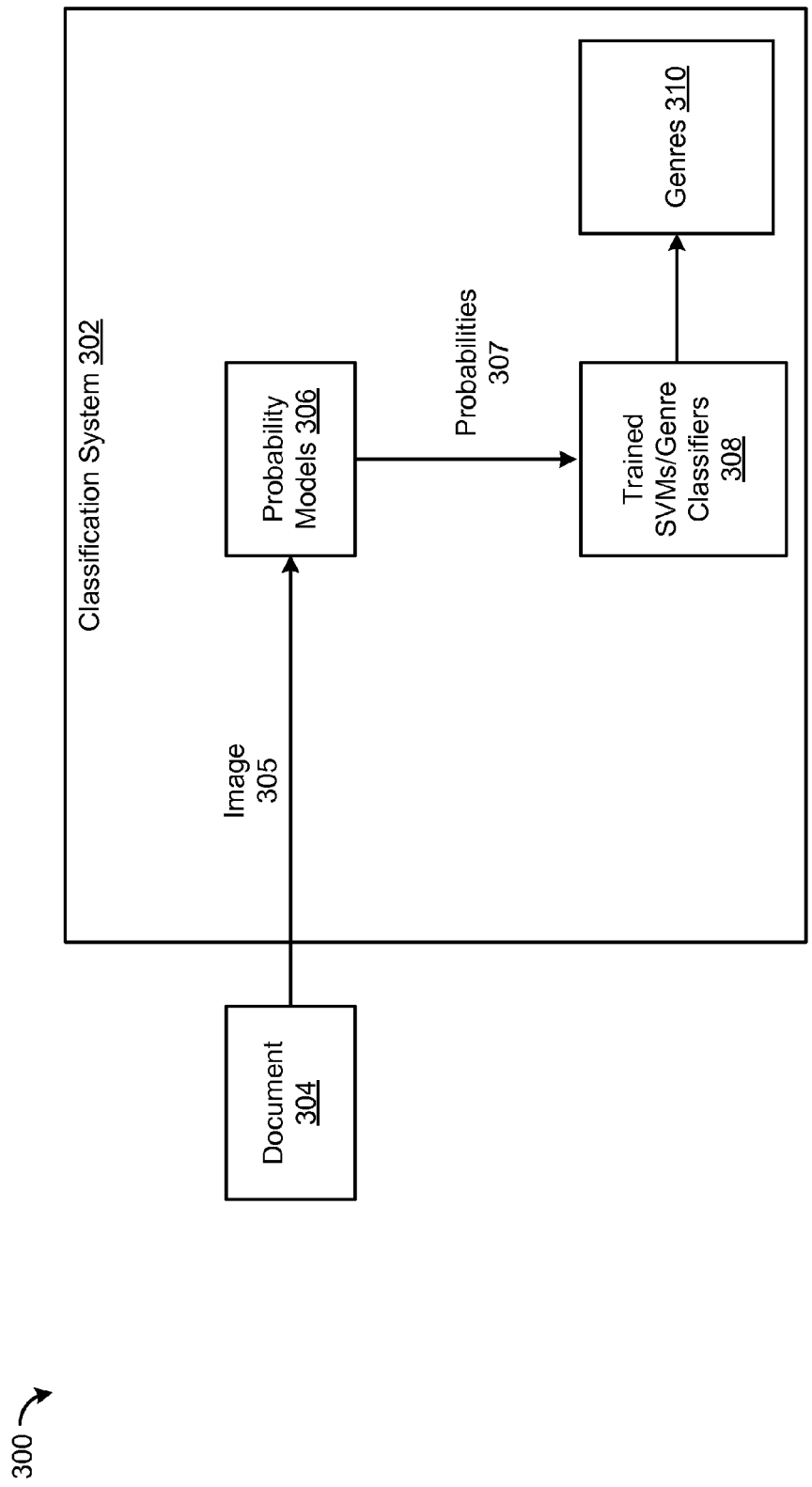
FIG. 3A is a block diagram illustrating a classification system, according to some embodiments.

FIG. 3A is a block diagram 300 illustrating a classification system 302, according to some embodiments. In these embodiments, the classification system 302 receives the features from a document 304 and applies probability models 306 (e.g., the probability models 208 in FIG. 2) to the document 304 to generate probabilities 307. The probabilities 307 are used by trained SVMs/genre classifiers 308 to identify one or more genres 310 that are associated with the document 304. In some embodiments, the classification system 302 includes an imaging device that scans the document 304 to produce an image 305 of the document 304. The features extracted from the image 305 of the document 304 is then used by the classification system 302 to identify the one or more genres 310 that are associated with the document 304. In some embodiments, the document 304 is already an image of a document and features are extracted directly and then used by the classification system 302 to identify the one or more genres 310 that are associated with the document 304. The classification system 302 is described in more detail with respect to FIGS. 4A and 5A.

In some embodiments, the classification system and the training system are included in the same system. For example, the classification system and the training system can be included an imaging system (e.g., the imaging system 104 in FIG. 1). In some embodiments, the classification system and the training system are included in separate systems. For example, the training system may be included in a computer system of a manufacturer of an imaging system (e.g., the imaging system 104) and the classification system may be included in the imaging systems (e.g., the imaging system 104) sold to end users.

Figure 4A:
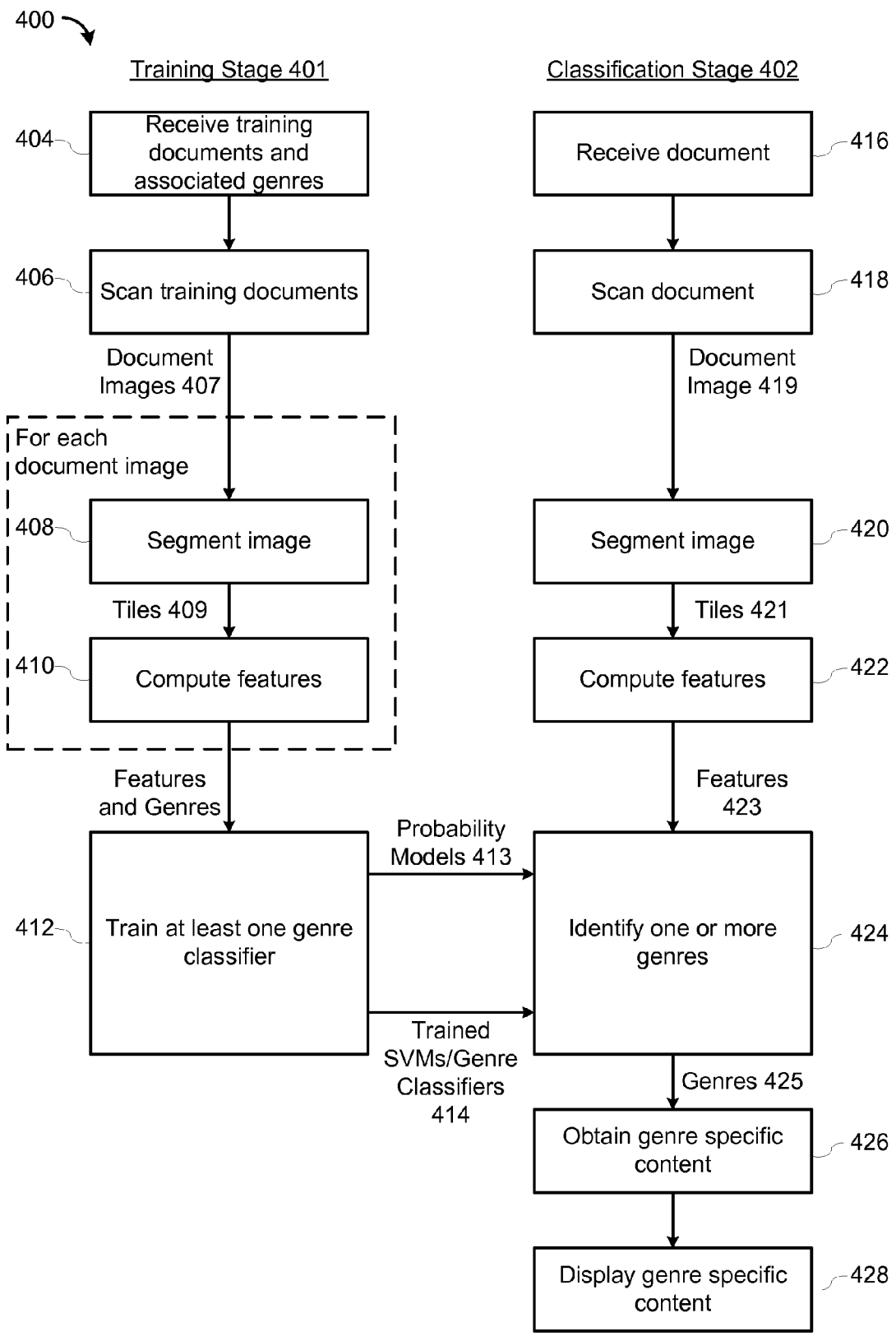
FIG. 4A is a flow diagram of a method for identifying document genres, according to some embodiments.

FIG. 4A is a flow diagram of a method 400 for identifying document genres, according to some embodiments. The method 400 corresponds to the operations performed by a training system (e.g., the training system 201 in FIG. 2A) and a classification system (e.g., the classification system 302 in FIG. 3A). Specifically, the method 400 includes a training stage 401 and a classification stage 402. Typically, the training stage 401 is performed on a training system (e.g., the training system 201 in FIG. 2A) and the classification stage 402 is performed on a classification system (e.g., the classification system 302 in FIG. 3A). These systems may be physically separate systems or may be the same system.

The operations of the training stage 401 are performed prior to the operations of the classification stage 402.

The training stage 401 begins when the training system receives (404) training documents and associated genres. As described above, each training document may be associated with one or more genres. The training system scans (406) the training documents to produce a set of document images 407. Alternatively, if the training documents have already been scanned, step 406 is omitted.

In some image-based techniques for identifying genres of documents, layout analysis is used to label and identify the boundaries of different types of document regions (e.g., text, image, ruled, graphics). Features are then extracted based on layout analysis. However, layout analysis is computationally expensive and error-prone. Furthermore, these layout analysis techniques use "small" tiles (e.g., 8 pixel by 8 pixel tiles). Similarly, some image-based techniques for identifying genres of documents identify salient points and perform classification based on the distribution of the features.

In contrast to these techniques, some embodiments segment each page of a document into tiles and extract features for each tile. In some embodiments, the tiles cover all parts of the page. Furthermore, the tiles may overlap each other (e.g., each tile may overlap adjacent tiles by half of a tile). A "page" tile that includes an entire page may also be produced. Moreover, these embodiments use "large" tiles (e.g., 25 tiles for each page).

Thus, for each document image in the set of document images 407, the training system segments (408) the document image into a plurality of tiles 409. In some embodiments, the training system segments the document image into the plurality of tiles 409 so that document page features (e.g., the number of lines of text, font height, etc.) are identifiable.

Attention is now directed to FIG. 6, which is a block diagram 600 illustrating the process of segmenting a document image into a plurality of tiles, according to some embodiments. In some embodiments, the document image is first preprocessed (e.g., reduced in size, de-skewed, etc.) As illustrated, a document image may be segmented into a specified number of tiles 602 of a specified dimension. In some embodiments, the specified number of tiles is twenty-five. The specified dimension may be selected so that features of the tiles are exhibited. In some embodiments, the tiles may be uniformly sized. For example, consider an 8.5" by 11" page that has been scanned at a resolution of 300 dots per inch. The dimensions of the page in pixels are 2550 pixels by 3300 pixels. Thus, each tile is 510 pixels by 660 pixels. In other embodiments, the tiles may be non-uniformly sized. In these embodiments, the size may be determined based on predetermined parameters (e.g., sizes of margins, etc.). Note that information from the plurality of tiles may be arranged in a predetermined order. For example, the plurality of tiles may be arranged in an order that maintains information about the physical location of the tile in the document image (e.g., the x-y location of the tile, etc.).

Returning to FIG. 4A, for each document image in the set of document images 407, the training system computes (410) the features of the document image and the plurality of tiles 409. In some embodiments, the features include document page features and tile features. The document page features may include one or more of: the number of columns of a respective page, the number of horizontal lines of the respective page, the number of vertical lines of the respective page, a histogram of horizontal line lengths of the respective page, a histogram of vertical line lengths of the respective page, a page size of the respective page, and the number of pages of a document. The tile features may include one or more of: a density of a respective tile, a number of rows of text of the respective tile (e.g., using projection), an average and/or a median font size of text of the respective tile (e.g., using projection), a histogram of row widths of the respective tile, a subset of values from a color correlogram of the respective tile, and an physical location of the respective tile in a document image. Color correlograms are discussed in J. Huang, S. R. Kumar, M. Mitra, W. J. Zhu, and R. Zabih. Image indexing using color correlograms. Proc. of 16th IEEE Conf. on Computer Vision and Pattern Recognition, pp. 762-768, 1997, which is hereby incorporated by reference in its entirety. In some embodiments, the feature vector for a respective tile includes page feature values (e.g., document image features). In doing so, the page feature values of one document image/page are replicated in each tile. These embodiments allow for clustering the tiles while also using information about document page features.

Image density may be computed by converting a page image to a binary image and summing the number of black pixels in each tile.

Horizontal lines may be computed by computing run lengths of black pixels in a black and white image horizontally, allowing for short pixel jogs horizontally or vertically (e.g., see K. Y. Wong, R. G. Casey, F. M. Wahl, "Document Analysis System," IBM Journal of Research and Development, 1982, which is hereby incorporated by reference in its entirety). The number of lines in each tile is noted and the line lengths may be quantized into a histogram. In some embodiments, "logarithmic" quantization bins are used. For example, the quantization bins for the line lengths may be separated into bins as follows: a first bin that includes line lengths between a half of the width of the page and a full width of the, a second bin that includes line lengths between a quarter of the width of the page and a half of the width of the page, . . . , to a fifth bin that includes line lengths less than one-thirty-seconds of the width of the page, for a total of five bins. Vertical line histograms may be computed similarly. Other quantization bins for line lengths can be used in other embodiments.

While extracting tile features such as the number of rows of text and the average and/or median font size, the pixels may be projected horizontally and the text rows may be identified and statistically characterized. This technique is referred to as "projection."

In some embodiments, the images are proportionally scaled to a maximum 1550 pixels in the horizontal and vertical direction, and then the color correlogram is computed. Feature selection may be performed to reduce the number of dimensions using minimum Redundancy Maximum Relevance (mRMR) Feature Selection (e.g., see H. Peng, F. Long, and C. Ding, "Feature selection based on mutual information: criteria of max-dependency, max-relevance, and min-redundancy," IEEE Transactions on Pattern Analysis and Machine Intelligence, vol. 27, no. 8, pp. 1226-1238, 2005, which is hereby incorporated by reference in its entirety).

Since feature values depend in part on tile location (e.g., titles usually appear at the top of a page), the feature selection technique maintains information about the location of tiles. Thus, feature selection may be performed on vectors formed by concatenating tile features. To use these features when clustering tiles, the locations of the selected features in its tile may be used, so that the features are the union of locations in the tiles.

Returning to FIG. 4A, after computing the features of the document images and the tiles, the training system then trains (412) at least one genre classifier to classify the document images as being associated with a genre based on the features of the document images in the set of document images 407, the features of the plurality of tiles of the set of document images 407, and the one or more genres associated with each document image in the set of document images 407.

Figure 5A:
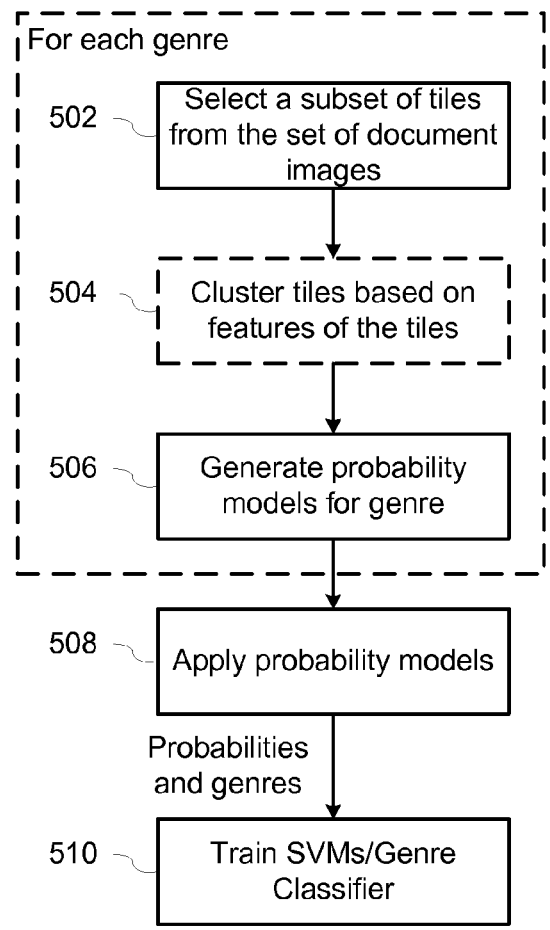
FIG. 5A is a flow diagram of a method for training a genre classifier, according to some embodiments.
Figure 7:
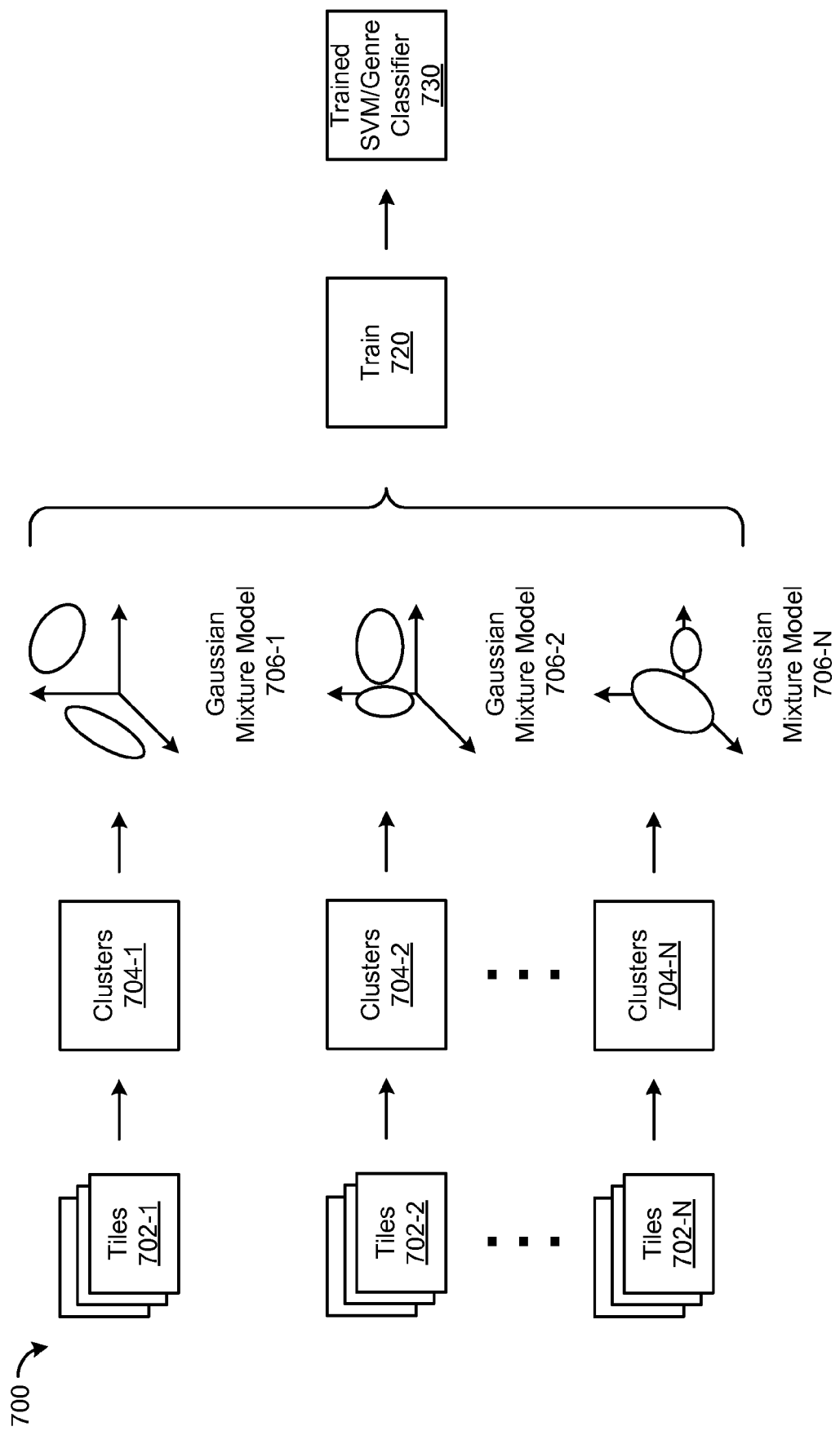
FIG. 7 is a block diagram illustrating a method for generating probability models that are used to identify genres of documents, according to some embodiments.

Attention is now directed to FIG. 5A, which is a flow diagram that describes the operations of step 412 in FIG. 4A, and FIG. 7, which is a block diagram 700 illustrating the operations described with respect to FIG. 5A. For each genre in at least a subset of genres associated with the document images in the set of document images 407, the training system selects (502) a subset of tiles from the set of document images 407, wherein each tile in the subset of tiles is associated with the genre (e.g., tiles 702-1, 702-2, and 702-N, respectively). In some embodiments, the training system clusters (504) tiles in the subset of tiles based on the features of the tiles (e.g., clusters 704-1, 704-2, 704-N, respectively) and generates (506) a probability model for the genre (e.g., Gaussian mixture models 706-1, 706-2, 706-N, respectively), wherein the probability model for the genre indicates a likelihood that a respective feature of a respective tile is a member of a cluster associated with the genre, wherein the probability model is included in a set of probability models (e.g., probability models 413 in FIG. 4A), each of which corresponds to a genre in the subset of genres.

In some embodiments, the clustering operation (e.g., step 504) is performed on the computed features for any of the embodiments described with reference to FIGS. 4A-4C. Probabilities that respective features of respective tiles are members of a cluster associated with the genre are then produced based on the clustering operation. These probabilities, or combinations (e.g., weighted sums) of these probabilities, are used in lieu of the computed features.

Note that the tiles are clustered so that the groups roughly correspond to different types of tiles, such as image, text, graphics, large font, or white space. Thus, rather than performing layout analysis, each of the tiles is implicitly "labeled" with image types, where the labeling may be weighted.

For at least a subset of document images in the set of document images 407, the training system applies (508) the probability models to the subset of document images and the plurality of tiles associated with the subset of document images to produce a set of probabilities that respective document images in the subset of document images are members of one or more genres.

The training system then trains (510, 720) the at least one genre classifier (e.g., trained SVMs/genre classifiers 414 in FIG. 4A, trained SVM/genre classifier 730 in FIG. 7) to classify the respective document image as being associated with one or more genres based on the set of probabilities and the one or more genres associated with each document image in the subset of document images.

Figure 8:
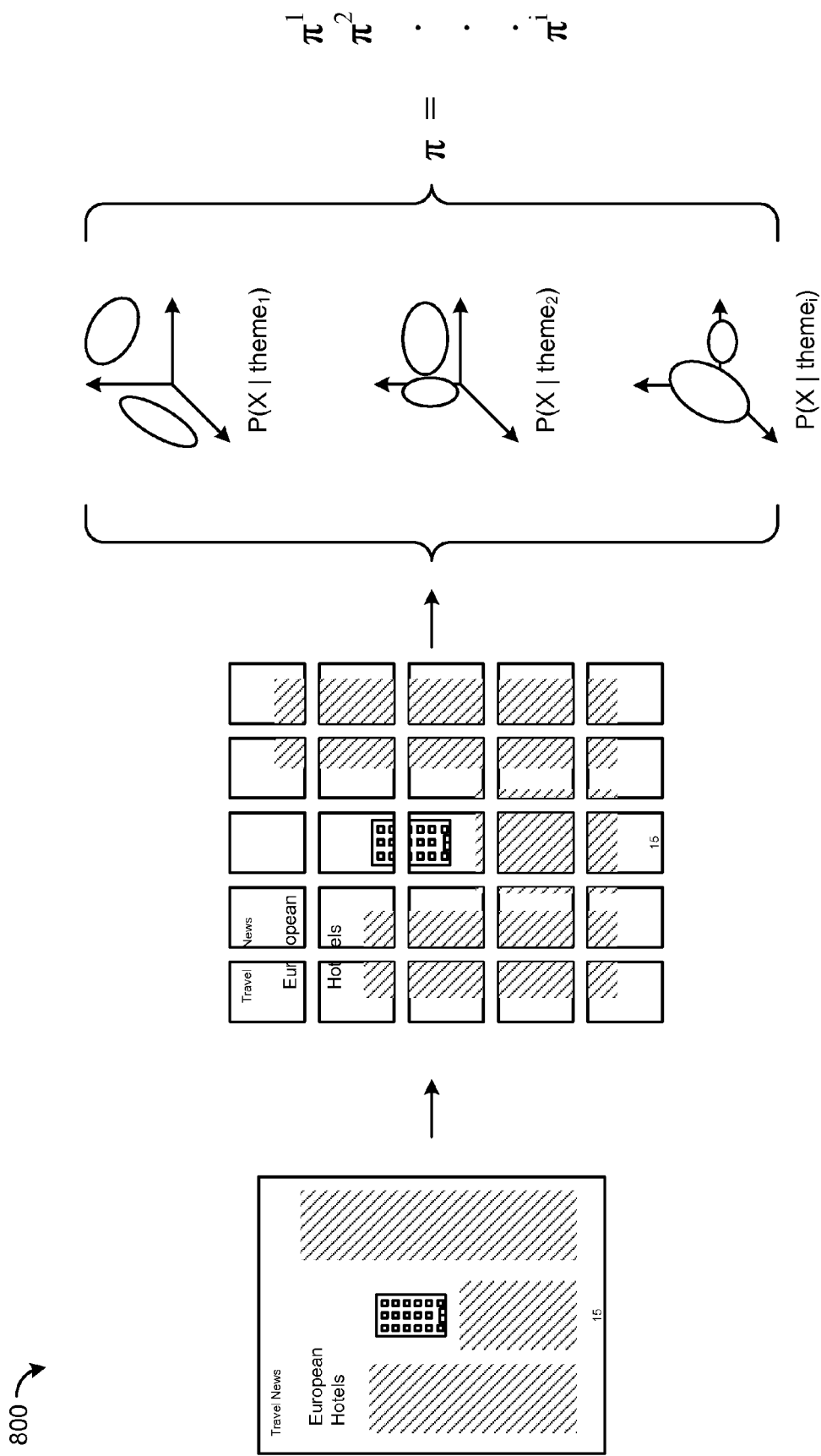
FIG. 8 is a block diagram illustrating a method for using probability models to generate probability vectors for a document, according to some embodiments.

An alternative technique is to compute the probability of each casual label as illustrated in FIG. 8, which is a block diagram 800 illustrating a method for using probability models to generate probability vectors for a document. The probability of each theme, t, or casual label probabilities, $\cup_t$, are computed using the Gaussian mixture model parameters where $\mu_t^j$ represents the mean, $\Phi_t^j$ represents the covariance, and $\beta_t^j$ represents the mixture weight of the $j^{th}$ mixture component of theme t:

$$\Pi_t = P_{T|X}(t \mid I) = \frac{P(x \mid t)}{\sum_i P(x \mid t_i)}$$

where:

$$P(x|t) = \Sigma \beta_t^j G(x, \mu_t^j, \Phi_t^j).$$

This choice reduces the dimensionality of the representation which in turn accelerates SVM training and testing. In each case, the x and y location of the tiles can be added as features to encourage use of tile location information. The classifiers are then trained on labeled feature data. To perform genre identification of a new document page, a set of features is computed for the page and then the probability of each genre is computed. These probabilities are used to derive features for training an SVM classifier.

Each classifier has been trained to identify one genre, with exemplars labeled with the genre used as positive examples, and all other exemplars labeled as negative examples. The different types of genre realizations are implicitly handled by using a max-margin classifier, such as an SVM, and possibly a kernel function that allows for possibly non-contiguous regions, such as a radial basis function (RBF).

Returning to FIG. 4A, once the at least one genre classifiers are trained, the classification system can use the trained genre classifiers to identify genres in new documents. The classification stage 402 begins when the classification system receives (416) a document (e.g., from a user). Typically, this document is a document that is not part of the training documents. The classification system scans (418) the document to produce a document image(s) 419. Alternatively, if the document has already been scanned, step 418 is omitted.

The classification system segments (420) the document image 419 into a plurality of tiles 421 and computes (422) features 423 of the document image 419 and the plurality of tiles 421. In some embodiments, the classification system segments the document image into the plurality of tiles 421 so that document page features (e.g., the number of lines of text, font height, etc.) are identifiable. The classification system then identifies (424) one or more genres 425 associated with the document image 419 based on the features 423 of the document image 419 and the features 423 of the plurality of tiles 421.

Figure 5B:
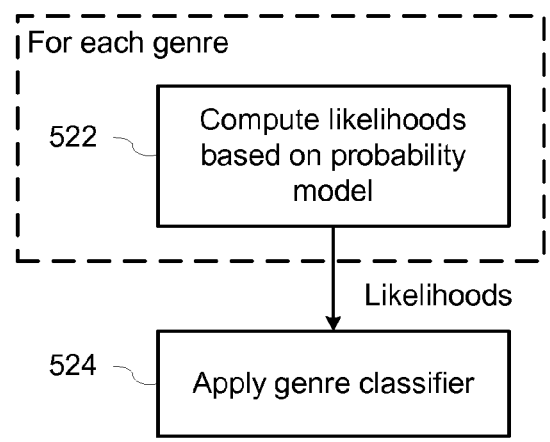
FIG. 5B is a flow diagram of a method for identifying one or more genres of a document, according to some embodiments.

Attention is now directed to FIG. 5B, which is a flow diagram that describes the operations of step 424 in FIG. 4A. For each genre, the classification system computes (522) a likelihood that the features 423 of the document image 419 and the plurality of tiles 421 of the document image 419 are members of a cluster of the genre based on the probability model of the genre. The classification system then applies (524) the trained SVMs/genre classifiers 414 to the computed likelihoods to identify the one or more genres 425 associated with the document image 419.

Returning to FIG. 4A, in some embodiments, after the one or more genres 425 are identified, the classification system obtains (426) genre specific content and displays (428) the genre specific content on a display device (e.g., a display device of the classification system, a server, a client computer system, etc.). For example, the genre specific content may include advertisements for products and/or services associated with the one or more genres 425. In some embodiments, the one or more genres 425 are returned. In these embodiments, the one or more genres 425 are used by the user and/or an application to perform specified operations (e.g., perform a search based on the one or more genres 425).

In some embodiments, after the classification system obtains the genre specific content, the classification system transmits an electronic message including the genre specific content to one or more specified users. For example, the classification system may transmit the electronic message to the specified users via an electronic mail message, short messaging service (SMS) message, a multimedia messaging service (MMS) message, etc.

In some embodiments, a subset of the document images are associated with a document that includes multiple pages. In these embodiments, the training stage 401 and the classification stage 402 may are performed on each page of the document.

Attention is now directed to the second training and classification technique. Note that the description above relating to features, segmenting the document also apply to the second technique described below. FIG. 2B is a block diagram 250 illustrating a training system 251, according to some embodiments. In these embodiments, a clustering module 252 of the training system 251 receives training documents 204 and the associated genres 206. Each document in the training documents 204 may be associated with one or more genres. The associations may be specified in metadata of each document, may be specified in a separate document (e.g., an XML file, a text file, etc.), or database that associates each training document with one or more genres. The clustering module 252 uses the training documents 204 and the associated genres 206 to produce a first set of trained SVMs/genre classifiers 254. A classifier module 253 uses score 255 produced by the first set of trained SVMs/genre classifiers 254 to train a second set of trained SVMs/genre classifiers 256, which are described in more detail with respect to FIGS. 4B and 5C. In some embodiments, the training system 215 includes an imaging device that scans the training documents 204 to produce images 205 of the training documents 204. The images 205 of the training documents 204 are then used by the training system 251. In some embodiments, the training documents 204 are already images of documents and are used directly by the training system 251.

Figure 3B:
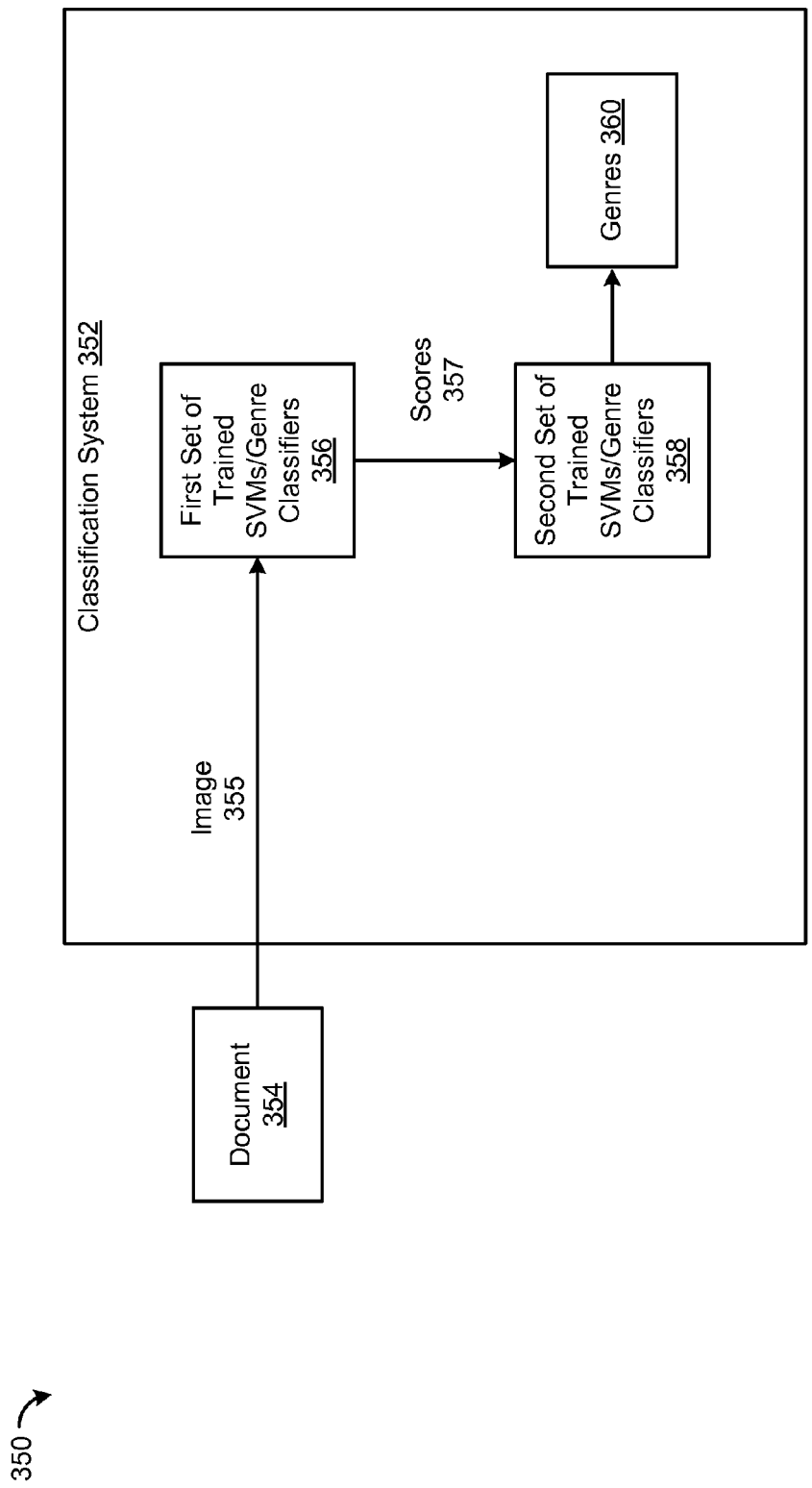
FIG. 3B is a block diagram illustrating another classification system, according to some embodiments.

FIG. 3B is a block diagram 350 illustrating a classification system 352, according to some embodiments. In these embodiments, the classification system 352 receives a document 354 and applies a first set of trained SVMs/genre classifiers 356 to the document 354 to produce scores 357. The classification system 352 then applies a second set of trained SVMs/genre classifiers 358 to the scores 357 to identify one or more genres 360 that are associated with the document 354. In some embodiments, the classification system 352 includes an imaging device that scans the document 354 to produce an image 355 of the document 354. The image 355 of the document 354 is then used by the classification system 352 to identify the one or more genres 360 that are associated with the document 354. In some embodiments, the document 354 is already an image of a document and is used directly by the classification system 352 to identify the one or more genres 360 that are associated with the document 354. The classification system 352 is described in more detail with respect to FIGS. 4B and 5D.

Figure 4B:
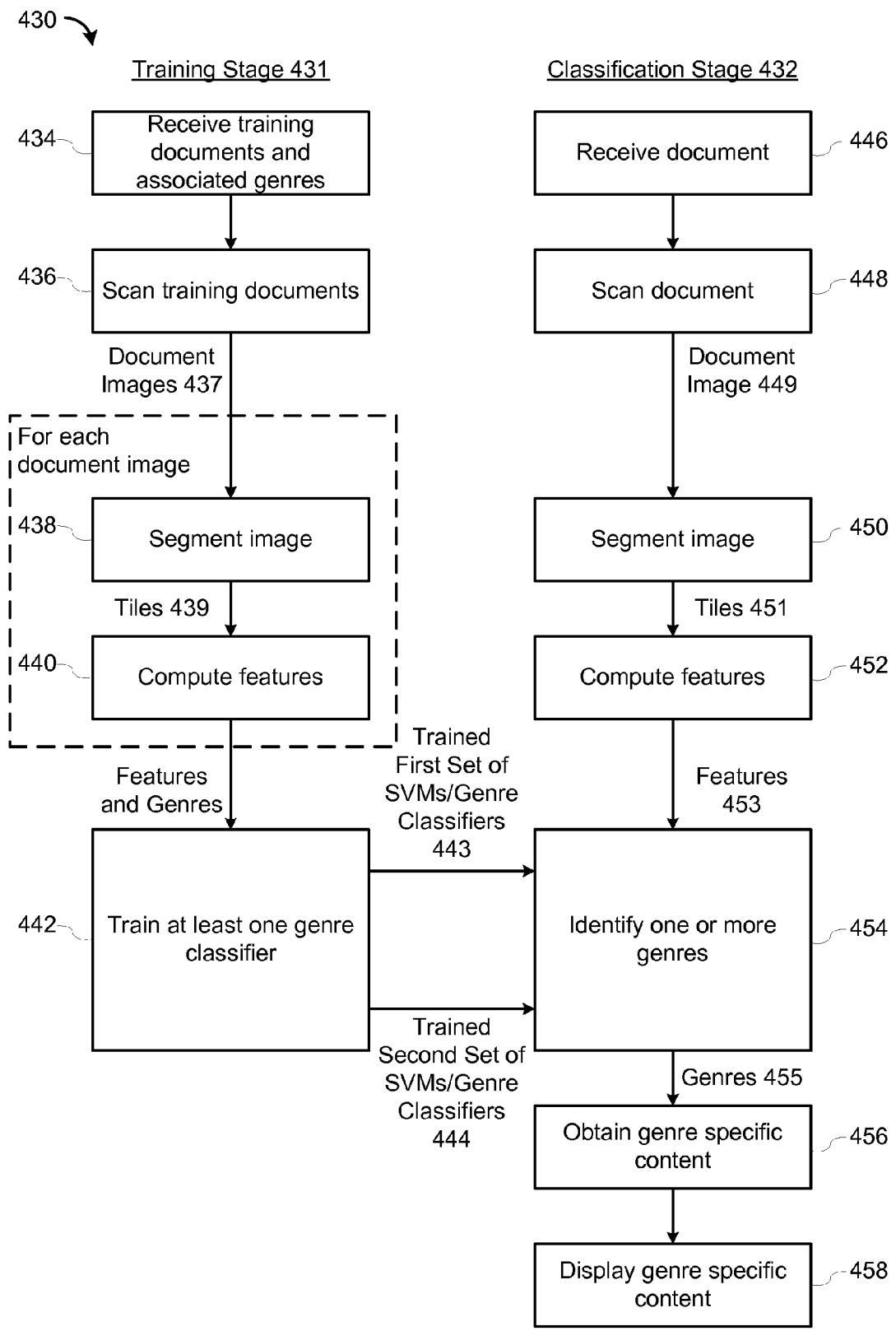
FIG. 4B is a flow diagram of another method for identifying document genres, according to some embodiments.

FIG. 4B is a flow diagram of a method 430 for identifying document genres, according to some embodiments. The method 430 corresponds to the operations performed by a training system (e.g., the training system 251 in FIG. 2B) and a classification system (e.g., the classification system 352 in FIG. 3B). Specifically, the method 430 includes a training stage 431 and a classification stage 432. Typically, the training stage 431 is performed on a training system (e.g., the training system 251 in FIG. 2B) and the classification stage 432 is performed on a classification system (e.g., the classification system 352 in FIG. 3B). These systems may be physically separate systems or may be the same system.

The operations of the training stage 431 are performed prior to the operations of the classification stage 432.

The training stage 431 begins when the training system receives (434) training documents and associated genres. As described above, each training document may be associated with one or more genres. The training system scans (436) the training documents to produce a set of document images 437. Alternatively, if the training documents have already been scanned, step 436 is omitted.

For each document image in the set of document images 437, the training system segments (438) the document image into a plurality of tiles 439 and computes (440) the features of the document image and the plurality of tiles 439. In some embodiments, the training system segments the document image into the plurality of tiles 439 so that document page features (e.g., the number of lines of text, font height, etc.) are identifiable.

The training system then trains (442) at least one genre classifier to classify the document images as being associated with a genre based on the features of the document images in the set of document images 437, the features of the plurality of tiles of the set of document images 437, and the one or more genres associated with each document image in the set of document images 437.

Figure 5C:
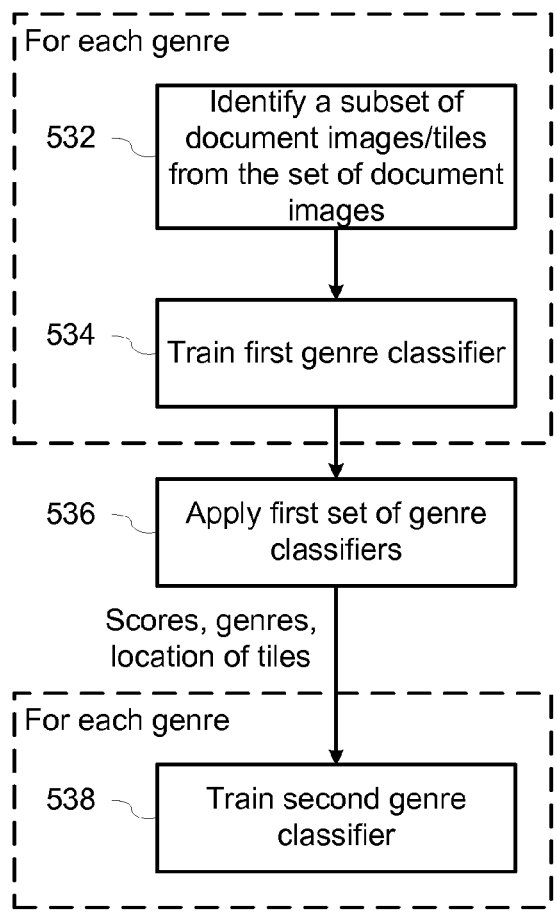
FIG. 5C is a flow diagram of another method for training a genre classifier, according to some embodiments.

Attention is now directed to FIG. 5C, which is a flow diagram that describes the operations of step 442 in FIG. 4B. For each genre, the training system selects (532) a subset of document images from the set of document images 437, each document image in the subset of document images being associated with the genre. The training system then trains (534) a first genre classifier corresponding to the genre based on the features of the document images, the features of the plurality of tiles associated with the document images, and information indicating which of the document images correspond to the identified subset of document images associated with the first genre. Thus, a first set of genre classifiers including the first genre classifier for each genre is produced (e.g., the trained first set of SVMs/genre classifiers 443 in FIG. 4B).

For at least a subset of the document images in the set of document images 437, the training system applies (536) the first set of genre classifiers (e.g., the trained first set of SVMs/genre classifiers 443 in FIG. 4B) to the document images in the subset of the document images and the plurality of tiles associated with the subset of the document images to produce a set of scores.

For each genre, the training system trains (538) a second genre classifier corresponding to the genre to classify document images as being associated with the genre based on the set of scores for each document image in the subset of document images, the one or more genres associated with each document image, and a location of tiles in the plurality of tiles for each document image. Thus, a second set of genre classifiers including the second genre classifier for each genre is produced (e.g., the trained second set of SVMs/genre classifiers 444 in FIG. 4B).

Returning to FIG. 4B, once the at least one genre classifiers are trained, the classification system can use the trained genre classifiers to identify genres in new documents. The classification stage 432 begins when the classification system receives (446) a document (e.g., from a user). Typically, this document is a document that is not part of the training documents. The classification system scans (448) the document to produce a document image 449. Alternatively, if the document has already been scanned, step 448 is omitted.

The classification system segments (450) the document image 449 into a plurality of tiles 451 and computes (452) features 453 of the document image 449 and the plurality of tiles 451. In some embodiments, the classification system segments the document image into the plurality of tiles 451 so that document page features (e.g., the number of lines of text, font height, etc.) are identifiable. The classification system then identifies (454) one or more genres 455 associated with the document image 449 based on the features 453 of the document image 449 and the features 453 of the plurality of tiles 451.

Figure 5D:
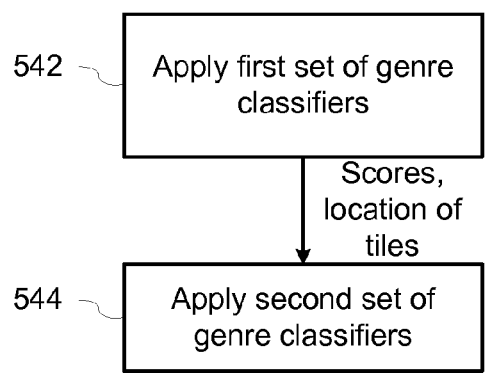
FIG. 5D is a flow diagram of another method for identifying one or more genres of a document, according to some embodiments.

Attention is now directed to FIG. 5D, which is a flow diagram that describes the operations of step 454 in FIG. 4B. The classification system applies (542) a first set of genre classifiers (e.g., the trained first set of SVMs/genre classifiers 443 in FIG. 4B) to the features of the document image 449 and the plurality of tiles 451 associated with the document image 449 to produce a set of scores. The classification system then applies (544) a second set of genre classifiers (e.g., the trained second set of SVMs/genre classifiers 444 in FIG. 4B) to the set of scores of the document image 449 and a location of tiles in the plurality of tiles 451 of the document image 449 to identify the one or more genres 455 associated with the document image 449.

Alternatively, the scores produced by first set of genre classifiers for each tile may be used in a voting paradigm to identify page genres.

Returning to FIG. 4B, in some embodiments, after the one or more genres 455 are identified, the classification system obtains (456) genre specific content and displays (458) the genre specific content on a display device (e.g., a display device of the classification system, a server, a client computer system, etc.). For example, the genre specific content may include advertisements for products and/or services associated with the one or more genres 455. In some embodiments, the one or more genres 455 are returned. In these embodiments, the one or more genres 455 are used by the user and/or an application to perform specified operations (e.g., perform a search based on the one or more genres 455).

In some embodiments, after the classification system obtains the genre specific content, the classification system transmits an electronic message including the genre specific content to one or more specified users. For example, the classification system may transmit the electronic message to the specified users via an electronic mail message, short messaging service (SMS) message, a multimedia messaging service (MMS) message, etc.

In some embodiments, a subset of the document images are associated with a document that includes multiple pages. In these embodiments, the training stage 431 and the classification stage 432 may are performed on each page of the document.

Attention is now directed to the third training and classification technique. Note that the description above relating to features, segmenting the document also apply to the third technique described below. FIG. 2C is a block diagram 280 illustrating a training system 281, according to some embodiments. In these embodiments, the training system 281 includes classifier modules 282 and 283. In some embodiments, the classifier modules 282 and 283 are separate and distinct modules. In some embodiments, the classifier modules 282 and 283 are the same type of classifier, but may have different parameter values. The training documents 204 are partitioned into two mutually exclusive training document subsets 284-285 having associated genre subsets 286-287. In some embodiments, the genre subsets 286-287 include the same genres. The classifier module 282 of the training system 281 receives the training documents subset 284 and the associated genres subset 286. Note that each document in the training documents 204 may be associated with one or more genres. The associations may be specified in metadata of each document, may be specified in a separate document (e.g., an XML file, a text file, etc.), or database that associates each training document with one or more genres. The classifier module 282 uses the training documents subset 284 and the associated genres subset 286 to produce a first set of trained SVMs/genre classifiers 290. The classifier module 282 uses the training documents subset 285 and the associated genres subset 287 to tune parameters for the first set of trained SCMs/genre classifiers 290. In a similar fashion, the classifier module 283 uses the training documents subset 285 and the associated genres subset 287 to produce a second set of trained SVMs/genre classifiers 291. The classifier module 283 uses the training documents subset 284 and the associated genres subset 286 to tune parameters for the second set of trained SCMs/genre classifiers 291. This process is described in more detail with respect to FIGS. 4C and 5E. In some embodiments, the training system 281 includes an imaging device that scans the training documents 204 to produce images 288-289 of the training documents subsets 284-285. The images 288-289 of the training documents subset 284-285 are then used by the training system 281. In some embodiments, the training documents subsets 284-285 are already images of documents and are used directly by the training system 281.

Figure 3C:
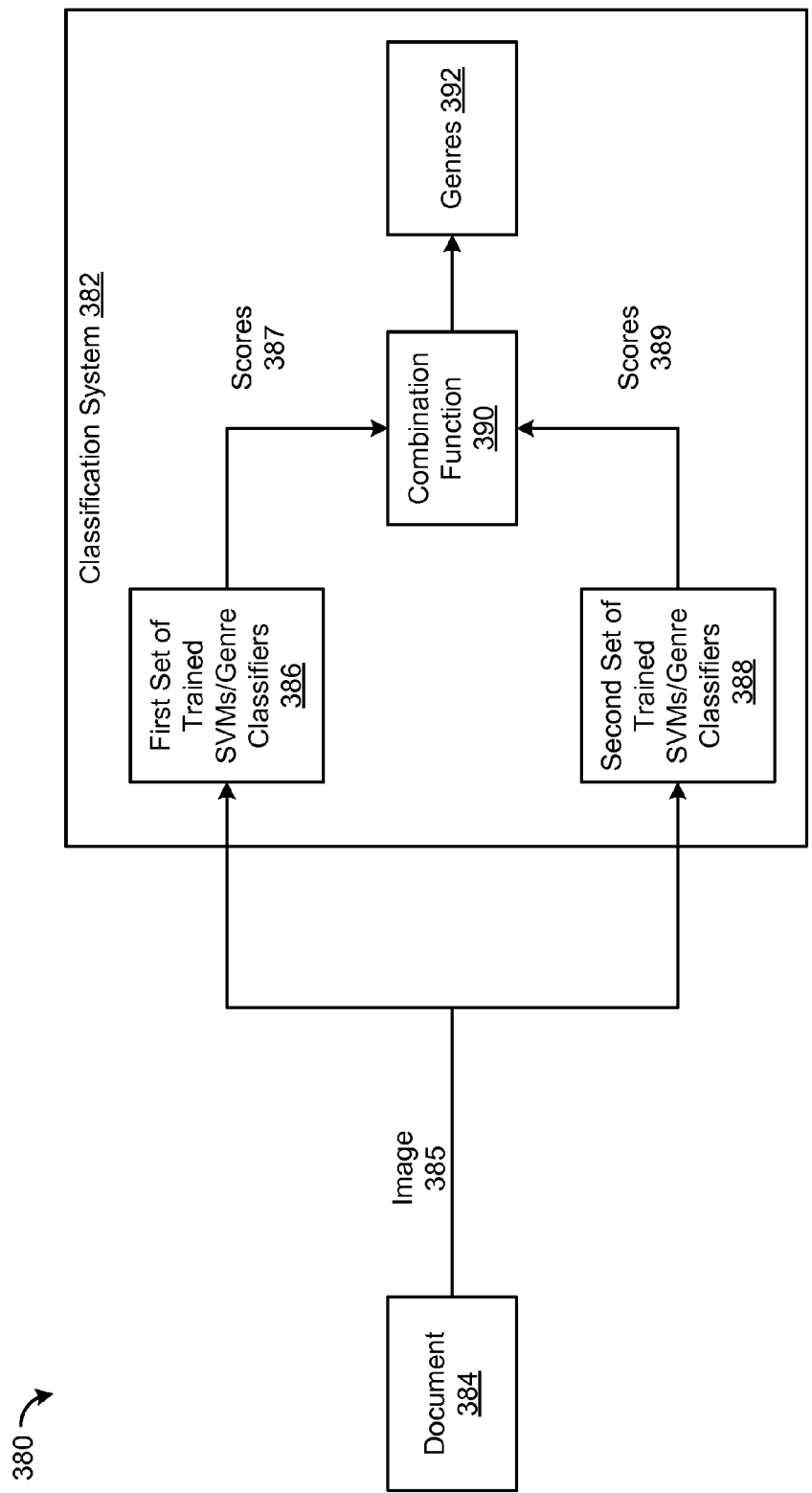
FIG. 3C is a block diagram illustrating another classification system, according to some embodiments.

FIG. 3C is a block diagram 380 illustrating a classification system 382, according to some embodiments. In these embodiments, the classification system 382 receives a document 384 and applies a first set of trained SVMs/genre classifiers 386 to produce scores 387 and a second set of trained SVMs/genre classifiers 388 to the document 384 to produce scores 389. A combination function 390 combines the scores 387 and 389 to identify one or more genres 392 that are associated with the document 384. An exemplary combination function that improves precision compares the scores 387 and 389 to threshold value(s). If the scores are greater than the threshold value(s) for at least one of the classifiers, and lower than the threshold value(s) for both classifiers for all other genres, then the page and/or document is classified as being associated with the genre corresponding to the classifier that produced the scores that are greater than the threshold value(s). A less restrictive alternative removes the requirement that the scores be lower than the threshold value(s) for both classifiers for all other genres, and instead only requires that scores be lower than the threshold value for at least one of the pair of classifiers for all other genres. In some embodiments, the classification system 382 includes an imaging device that scans the document 384 to produce an image 385 of the document 384. The image 385 of the document 384 is then used by the classification system 382 to identify one or more genres 392 that are associated with the document 384. In some embodiments, the document 384 is already an image of a document and is used directly by the classification system 382 to identify one or more genres 392 that are associated with the document 384. The classification system 382 is described in more detail with respect to FIGS. 4C and 5F.

Figure 4C:
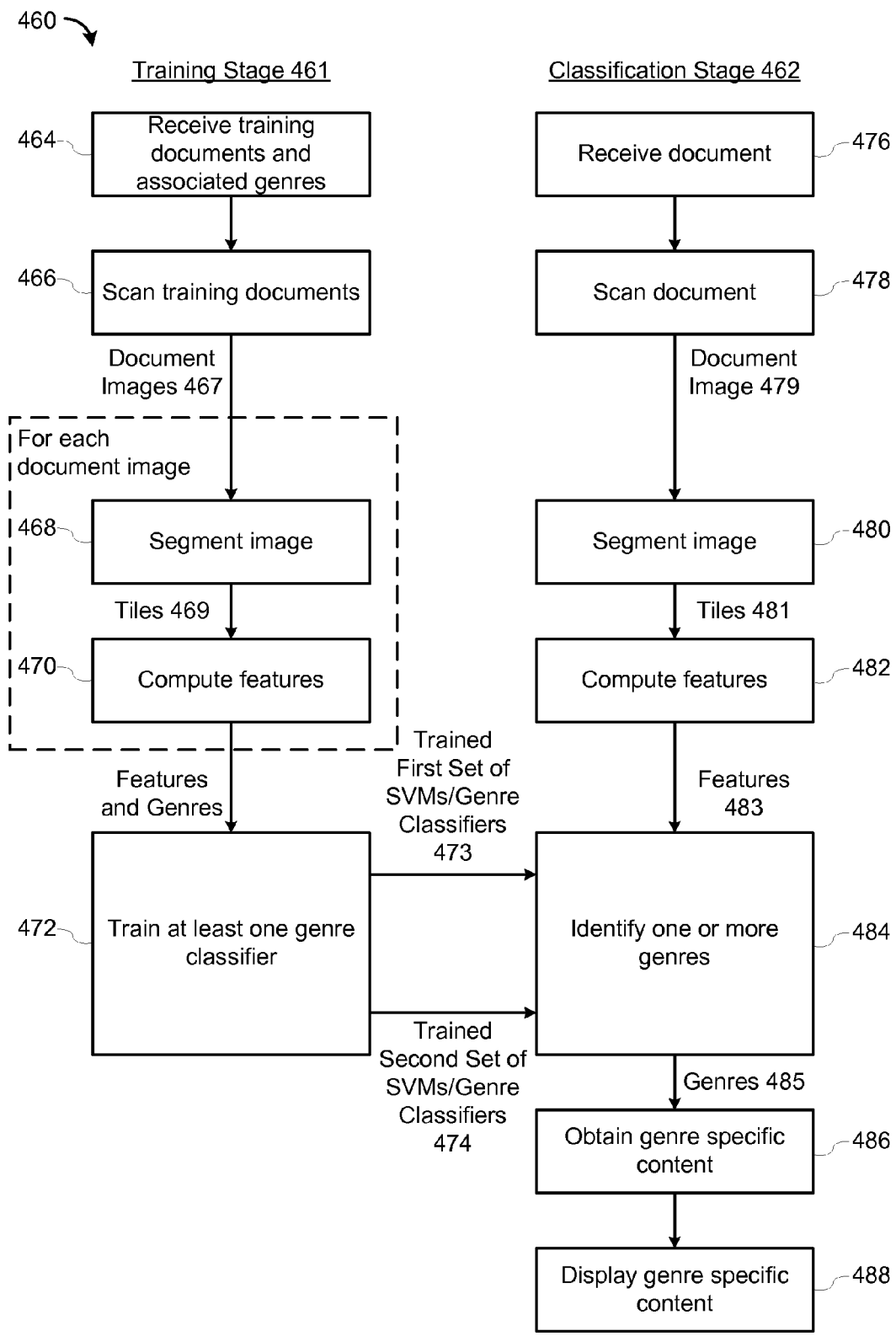
FIG. 4C is a flow diagram of another method for identifying document genres, according to some embodiments.

FIG. 4C is a flow diagram of a method 460 for identifying document genres, according to some embodiments. The method 460 corresponds to the operations performed by a training system (e.g., the training system 281 in FIG. 2C) and a classification system (e.g., the classification system 382 in FIG. 3C). Specifically, the method 460 includes a training stage 461 and a classification stage 462. Typically, the training stage 461 is performed on a training system (e.g., the training system 381 in FIG. 2C) and the classification stage 462 is performed on a classification system (e.g., the classification system 382 in FIG. 3C). These systems may be physically separate systems or may be the same system.

The operations of the training stage 461 are performed prior to the operations of the classification stage 462.

The training stage 461 begins when the training system receives (464) training documents and associated genres. As described above, each training document may be associated with one or more genres. The training system scans (466) the training documents to produce a set of document images 467. Alternatively, if the training documents have already been scanned, step 466 is omitted.

For each document image in the set of document images 467, the training system segments (468) the document image into a plurality of tiles 469 and computes (470) the features of the document image and the plurality of tiles 469. In some embodiments, the training system segments the document image into the plurality of tiles 469 so that document page features (e.g., the number of lines of text, font height, etc.) are identifiable.

The training system then trains (472) at least one genre classifier to classify the document images as being associated with a genre based on the features of the document images in the set of document images 467, the features of the plurality of tiles of the set of document images 467, and the one or more genres associated with each document image in the set of document images 467.

Figure 5E:
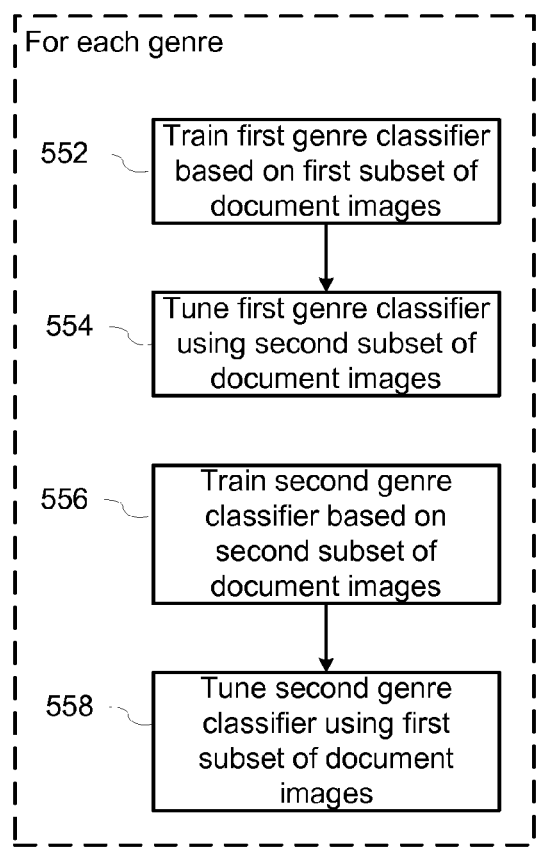
FIG. 5E is a flow diagram of another method for training a genre classifier, according to some embodiments.

Attention is now directed to FIG. 5E, which is a flow diagram that describes the operations of step 442 in FIG. 4B. For each genre, the training system trains (552) a first genre classifier (e.g., the trained first set of SVMs/genre classifiers 473 in FIG. 4C) corresponding to the first genre based on the features of a first subset of the set of document images 467 and the features of the plurality of tiles associated with the first subset of the set of document images 467. The training system tunes (554) parameters of the first genre classifier using a second subset of the set of document images 467, wherein the first subset and the second subset of the set of document images 467 are mutually-exclusive sets of document images. Thus, the training system may train the first genre classifier based on a specified set of SVM parameter values and tune the SVM parameters of the first genre classifier using the second subset of the set of document images 467. In some embodiments, the SVM parameter values that produce the best results in the second subset of the set of document images 467 are used as the SVM parameter values for the first genre classifier. The training system then trains (556) a second genre classifier (e.g., the trained first set of SVMs/genre classifiers 474 in FIG. 4C) corresponding to the first genre based on the features of a second subset of the set of document images 467 and the features of the plurality of tiles associated with the second subset of the set of document images 467. The training system tunes (558) parameters of the second genre classifier using the first subset of the set of document images 467. Thus, the training system may train the second genre classifier based on a specified set of SVM parameter values and tune the SVM parameters of the second genre classifier using the first subset of the set of document images 467. In some embodiments, the SVM parameter values that produce the best results in the first subset of the set of document images 467 are used as the SVM parameter values for the second genre classifier. In some embodiments, the first subset of the set of document images includes document images associated with both the first genre and other genres. In some embodiments, the first subset of the set of document images only includes document images associated with the first genre. In some embodiments, the second subset of the set of document images includes document images associated with both the second genre and other genres. In some embodiments, the second subset of the set of document images only includes document images associated with the second genre.

Returning to FIG. 4C, once the at least one genre classifiers are trained, the classification system can use the trained genre classifiers to identify genres in new documents. The classification stage 462 begins when the classification system receives (476) a document (e.g., from a user). Typically, this document is a document that is not part of the training documents. The classification system scans (478) the document to produce a document image 479. Alternatively, if the document has already been scanned, step 478 is omitted.

The classification system segments (480) the document image 479 into a plurality of tiles 481 and computes (482) features 483 of the document image 479 and the plurality of tiles 481. In some embodiments, the training system segments the document image into the plurality of tiles 481 so that document page features (e.g., the number of lines of text, font height, etc.) are identifiable. In some embodiments, the features 483 include the probabilities/likelihoods described above with respect to FIGS. 4A and 5A-5B. The classification system then identifies (484) one or more genres 485 associated with the document image 479 based on the features 483 of the document image 449 and the features 483 of the plurality of tiles 481.

Figure 5F:
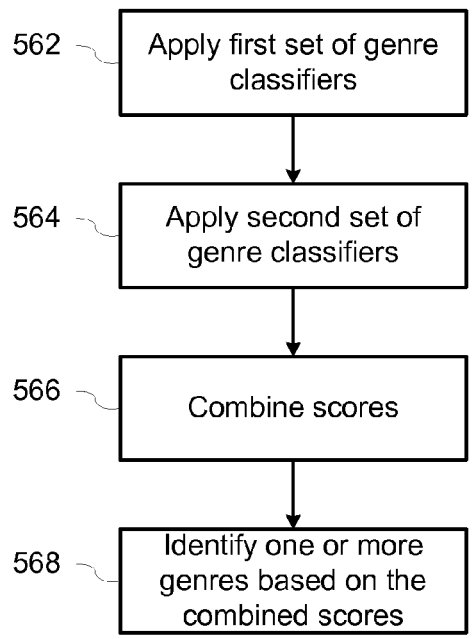
FIG. 5F is a flow diagram of another method for identifying one or more genres of a document, according to some embodiments.

Attention is now directed to FIG. 5F, which is a flow diagram that describes the operations of step 484 in FIG. 4C. The classification system applies (562) a first set of genre classifiers (e.g., the trained first set of SVMs/genre classifiers 473 in FIG. 4C) to the features 483 of the document image 479 and the plurality of tiles 481 associated with the document image 479 to produce a first set of scores. The classification system applies (564) a second set of genre classifiers (e.g., the trained second set of SVMs/genre classifiers 474 in FIG. 4C) to the features 483 of the document image 479 and the plurality of tiles 481 associated with the document image to produce a second set of scores. The classification system then combines (566) the first set of scores and the second set of scores to produce a combined set of scores and identifies (568) the one or more genres associated with the document image 479 based on the combined set of scores. In some embodiments, the classification system combines the first set of scores and the second set of scores by determining whether the scores from either set exceeds a specified threshold and if so, identifies the document image 479 as being associated with one or more genres that correspond to the scores that exceed the specified threshold. In some embodiments, a weighted combination of the first set of scores and the second set of scores is used to identify the one or more genres associated with the document image 479.

Returning to FIG. 4C, in some embodiments, after the one or more genres 485 are identified, the classification system obtains (486) genre specific content and displays (488) the genre specific content on a display device (e.g., a display device of the classification system, a server, a client computer system, etc.). For example, the genre specific content may include advertisements for products and/or services associated with the one or more genres 485. In some embodiments, the one or more genres 485 are returned. In these embodiments, the one or more genres 485 are used by the user and/or an application to perform specified operations (e.g., perform a search based on the one or more genres 485).

In some embodiments, after the classification system obtains the genre specific content, the classification system transmits an electronic message including the genre specific content to one or more specified users. For example, the classification system may transmit the electronic message to the specified users via an electronic mail message, short messaging service (SMS) message, a multimedia messaging service (MMS) message, etc.

In some embodiments, a subset of the document images are associated with a document that includes multiple pages. In these embodiments, the training stage 461 and the classification stage 462 may are performed on each page of the document.

The methods described in FIGS. 4A-4C and 5A-5F may be governed by instructions that are stored in a computer readable storage medium and that are executed by one or more processors of a training system and/or a classification system. Each of the operations shown in FIGS. 4A-4C and 5A-5F may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted by one or more processors.

Figure 9:
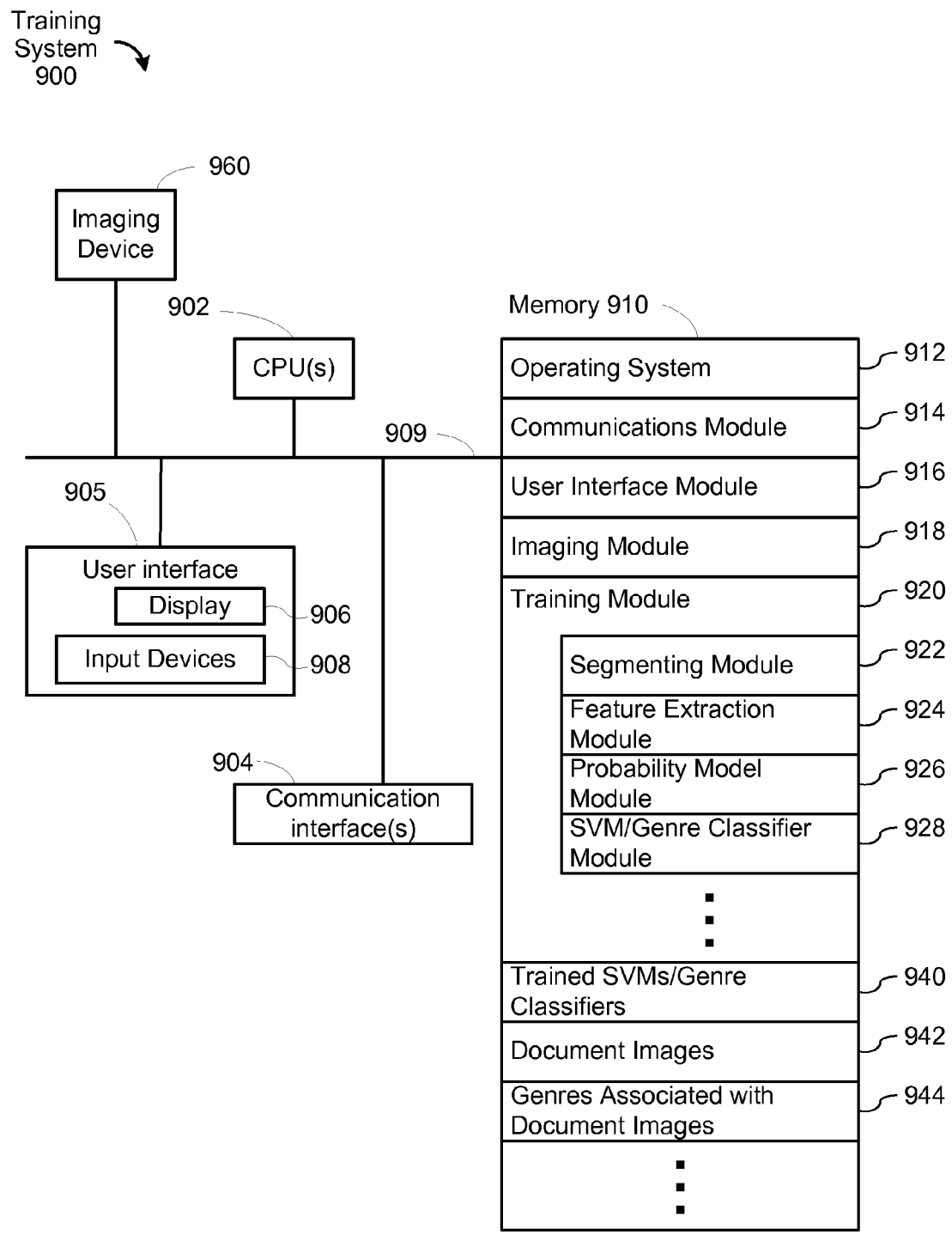
FIG. 9 is a block diagram illustrating a training system, according to some embodiments.

FIG. 9 is a block diagram illustrating a training system 900, according to some embodiments. The training system 900 can be any of the training systems 201, 251, and 281 in FIGS. 2A, 2B, and 2C, respectively. The training system 900 typically includes one or more processing units (CPU's) 902, one or more network or other communications interfaces 904, memory 910, and one or more communication buses 909 for interconnecting these components. Optionally, the training system 900 may include an imaging device 960 that is configured to optically scan a document to produce a document image (e.g., a digital image of the document). The communication buses 909 may include circuitry (sometimes called a chipset) that interconnects and controls communications between system components. The training system 900 optionally may include a user interface 905 comprising a display device 906 and input devices 908 (e.g., keyboard, mouse, touch screen, keypads, etc.). Memory 910 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 910 may optionally include one or more storage devices remotely located from the CPU(s) 902. Memory 910, or alternately the non-volatile memory device(s) within memory 910, comprises a computer readable storage medium. In some embodiments, memory 910 stores the following programs, modules and data structures, or a subset thereof:

an operating system 912 that includes procedures for handling various basic system services and for performing hardware dependent tasks;

a communication module 914 that is used for connecting the training system 900 to other systems via the one or more communication interfaces 904 (wired or wireless) and one or more communication networks, such as the Internet, other wide area networks, local area networks, metropolitan area networks, and so on;

a user interface module 916 that receives commands from the user via the input devices 908 and generates user interface objects in the display device 906;

an optional imaging module 918 that includes procedures for obtaining images (e.g., document images 942) from the imaging device 960;

a training module 920, including a segmenting module 922 that segments a document image into tiles as described herein, a feature extraction module 924 that extracts features of the document image and/or the tiles as described herein, an optional probability model module 926 that calculates that likelihood that features are members of one or more clusters of genres as described herein, and SVM/genre classifier module 928 that trains one or more SVMs/genre classifiers as described herein;

trained SVMs/genre classifiers 940, which are produced by the SVM/genre classifier module 928;

document images 942 that are used by the training module 920 (e.g., images that are obtained from the imaging device 960); and genres associated with document images 944 that include genre information for each of the document images (e.g., extracted from the metadata of the document, provided in a separate document, database, or file, etc.).

Each of the above identified elements may be stored in one or more of the previously mentioned memory devices, and corresponds to a set of instructions for performing a function described above. The set of instructions can be executed by one or more processors (e.g., the CPUs 902). The above identified modules or programs (i.e., sets of instructions) need not be implemented as separate software programs, procedures or modules, and thus various subsets of these modules may be combined or otherwise re-arranged in various embodiments. In some embodiments, memory 910 may store a subset of the modules and data structures identified above. Furthermore, memory 910 may store additional modules and data structures not described above.

Although FIG. 9 shows a "training system," FIG. 9 is intended more as functional description of the various features which may be present in a training system than as a structural schematic of the embodiments described herein. In practice, and as recognized by those of ordinary skill in the art, items shown separately could be combined and some items could be separated. For example, some items shown separately in FIG. 9 could be implemented on a single training system and single items could be implemented by one or more training systems. Furthermore, the training system 900 may be included in a classification system. For example, an imaging system (e.g., the imaging system 104 in FIG. 1) may include both a classification system and the training system 900.

Figure 10:
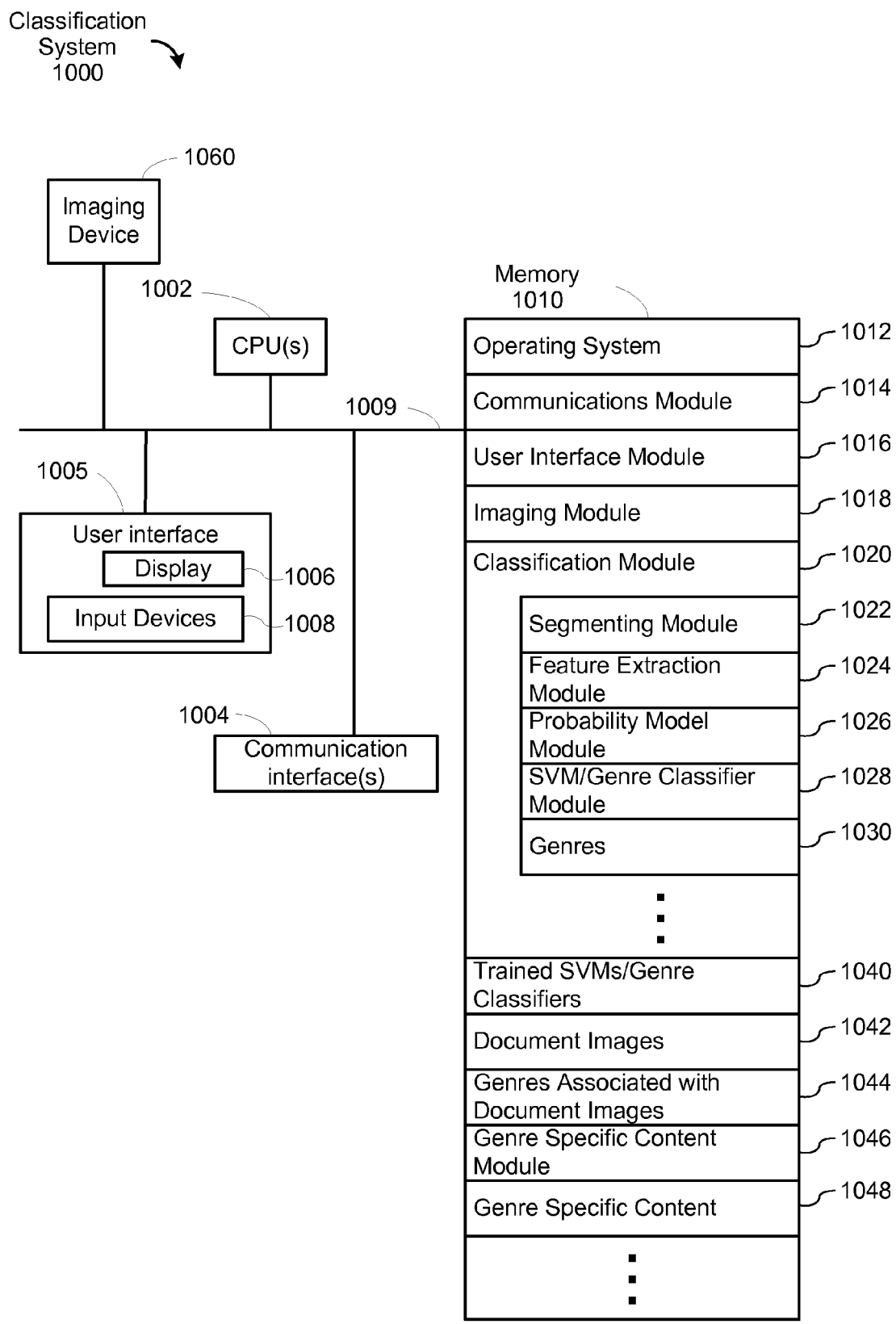
FIG. 10 is a block diagram illustrating a classification system, according to some embodiments.

FIG. 10 is a block diagram illustrating a classification system 1000, according to some embodiments. The classification system 1000 can be any of the classification systems 302, 352, and 382 in FIGS. 3A, 3B, and 3C, respectively. The classification system 1000 typically includes one or more processing units (CPU's) 1002, one or more network or other communications interfaces 1004, memory 1010, and one or more communication buses 1009 for interconnecting these components. Optionally, the classification system 1000 may include an imaging device 1060 that is configured to optically scan a document to produce a document image (e.g., a digital image of the document). The communication buses 1009 may include circuitry (sometimes called a chipset) that interconnects and controls communications between system components. The classification system 1000 optionally may include a user interface 1005 comprising a display device 1006 and input devices 1008 (e.g., keyboard, mouse, touch screen, keypads, etc.). Memory 1010 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1010 may optionally include one or more storage devices remotely located from the CPU(s) 1002. Memory 1010, or alternately the non-volatile memory device(s) within memory 1010, comprises a computer readable storage medium. In some embodiments, memory 1010 stores the following programs, modules and data structures, or a subset thereof:

an operating system 1012 that includes procedures for handling various basic system services and for performing hardware dependent tasks;

a communication module 1014 that is used for connecting the classification system 1000 to other systems via the one or more communication interfaces 1004 (wired or wireless) and one or more communication networks, such as the Internet, other wide area networks, local area networks, metropolitan area networks, and so on;

a user interface module 1016 that receives commands from the user via the input devices 1008 and generates user interface objects in the display device 1006;

an optional imaging module 1018 that includes procedures for obtaining images (e.g., document images 1042) from the imaging device 1060;

a classification module 1020, including a segmenting module 1022 that segments a document image into tiles as described herein, a feature extraction module 1024 that extracts features of the document image and/or the tiles as described herein, an optional probability model module 1026 that calculates that likelihood that features are members of one or more clusters of genres as described herein, SVM/genre classifier module 1028 that applies one or more trained SVMs/genre classifiers (e.g., trained SVM/genre classifiers 1040) to identify one or more genres (e.g., genres 1030) associated with document images (e.g., document images 1042) as described herein;

trained SVMs/genre classifiers 1040, which are produced by a training system (e.g., the training system 900 in FIG. 9;

document images 1042 that are used by the classification module 1020 (e.g., images that are obtained from the imaging device 1060);

genres associated with document images 1044 that are identified by the classification module 1020; and an optional genre specific content module 1046 that obtains genre specific content 1048 from one or more servers via communication interfaces 1004, wherein the genre specific content 1048 may be displayed on display device 1006 or electronically transmitted to specified users via the communication interfaces 1004 as described herein.

Each of the above identified elements may be stored in one or more of the previously mentioned memory devices, and corresponds to a set of instructions for performing a function described above. The set of instructions can be executed by one or more processors (e.g., the CPUs 1002). The above identified modules or programs (i.e., sets of instructions) need not be implemented as separate software programs, procedures or modules, and thus various subsets of these modules may be combined or otherwise re-arranged in various embodiments. In some embodiments, memory 1010 may store a subset of the modules and data structures identified above. Furthermore, memory 1010 may store additional modules and data structures not described above.

Although FIG. 10 shows a "classification system," FIG. 10 is intended more as functional description of the various features which may be present in a classification system than as a structural schematic of the embodiments described herein. In practice, and as recognized by those of ordinary skill in the art, items shown separately could be combined and some items could be separated. For example, some items shown separately in FIG. 10 could be implemented on a single classification system and single items could be implemented by one or more classification systems. Furthermore, the classification system 1000 may include a training system. For example, an imaging system (e.g., the imaging system 104 in FIG. 1) may include both a classification system and the classification system 1000.

In some embodiments, the training system 900 and the classification system 1000 are located on the same system (e.g., a copy machine, etc.). In some embodiments, the training system 900 and the classification system 1000 are located on separate systems. For example, the training system 900 may be located on a system of a manufacturer, whereas the classification system 100 may be located on an end user system.

Handling Weakly Labeled Data

In some embodiments, each document in the training set is manually classified into one of several genres. For example, these genres include: ads, brochures, casual papers, flyers, forms, maps, papers, photos, receipts, rules and regulations, reports, resumes, tables, etc. However, a document may be associated with more than one genre. For example, a one page invitation to a party in the form of a flyer may belong to both the "invitation" genre as well as the "party" genre. Thus, in some embodiments, the classification system described herein identifies one or more genres of a document.

By training the SVMs using a one-against-many model, a page may be classified into more than genre, which can be desirable depending on the application. Classification into a single class may be performed by any of the standard methods for multi-class SVMs, including classification into the class with the highest decision function value.

Evaluation

The classification system described herein was evaluated using data from 599 documents with a total of 3469 pages. The first 20 pages of a document were included if the document was longer than 20 pages. Each document was manually labeled with an appropriate genre.

The data was divided into three parts (train, development, and test) with approximately the same number of documents from a genre assigned to each part. Thus far, the train and development partitions have been used in these experiments.

Figure 11:
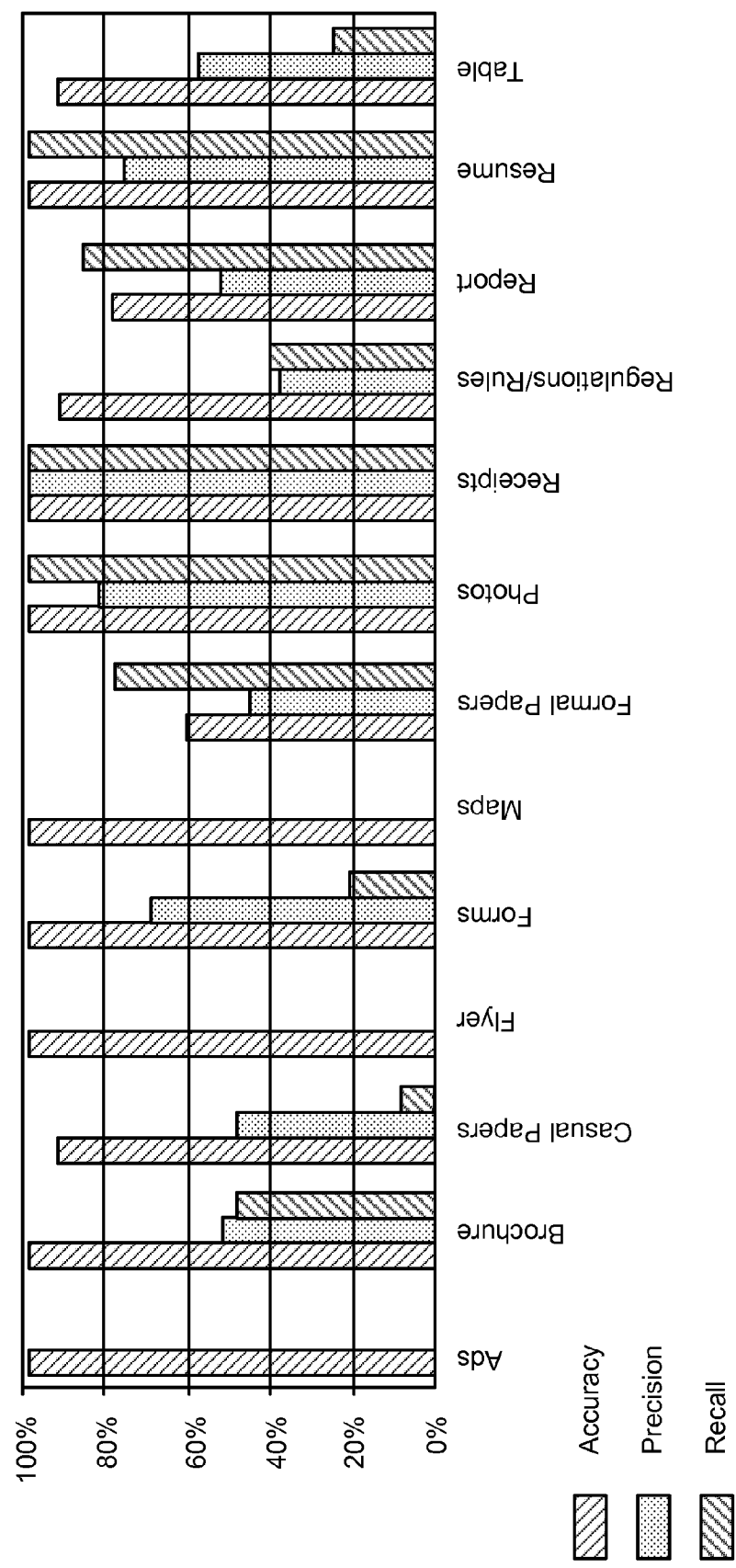
FIG. 11 is a graph illustrating the accuracy, precision, and recall of a classification system, according to some embodiments.

A first experiment was performed where a Gaussian Mixture Model with eight components, characterized by mean and covariance, was computed for each genre. Each page of the development data was then classified into the class with the largest score after uniform voting by the tiles in the page. The results are shown in FIG. 11. As illustrated in FIG. 11, photos and receipts are identified relatively well.

Figure 12:
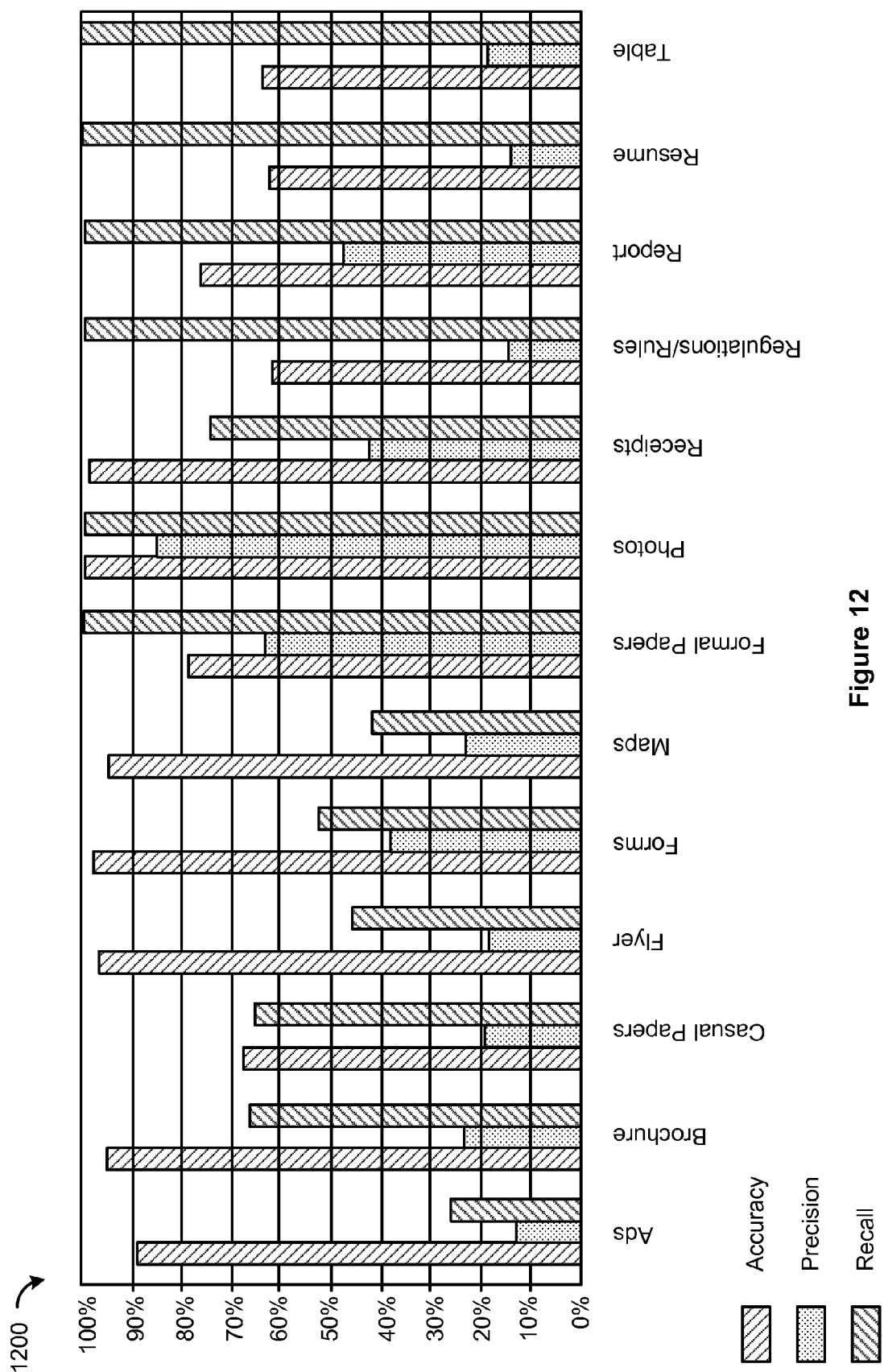
FIG. 12 is another graph illustrating the accuracy, precision, and recall of a classification system, according to some embodiments.

A second experiment using latent classes and an SVM was performed. The latent classes were computed on the training partition and the class models were used to compute the class probabilities for each test page. The jackknife method was used on the development data, wherein the model is trained on all pages except those from one document. The trained model was then evaluated on the pages that were left out. The results for all documents were then combined. These results are summarized using accuracy (e.g., the degree to which the genre determined by the classification system matches the actual genre), precision (e.g., the number of pages correctly identified by the system as belonging to a particular genre divided by the total number of pages identified by the system as belonging to a particular genre), and recall measures (e.g., the number of pages correctly identified by the system as belonging to a particular genre divided by the total number of pages in a corpus that actually belong to a particular genre), as shown in FIG. 12. As illustrated in FIG. 12, the one-against-all model has better recall than the voting method of FIG. 11 for some classes (e.g., flyers, maps, and paper). This may be due to some flyers and maps also falling into other genres (e.g., an invitation that is also a flyer), since the documents were labeled with only one genre. Also, when using the SVM, the parameter settings were biased towards recall over precision. The parameter settings can be adjusted to improve precision at the expense of recall.

A third experiment was performed by comparing the techniques described herein with the techniques presented by Kim and Ross (Y. Kim and S. Ross, "Detecting family resemblance: Automated genre classification," Data Science Journal, 6(2007), pp. S172-S183, 2007, which is hereby incorporated by reference in its entirety). The genres analyzed by Kim and Ross included scientific articles, which are similar to the category "papers" described herein. For their image-based genre classifier, Kim and Ross had a precision and recall of 0.21 and 0.80, respectively. Kim and Ross also analyzed business reports and reported a precision of 0.56 and recall of 0.636. Kim and Ross (Y. Kim and S. Ross, "Examining variations of prominent features in genre classification," Proc. of the 41st Annual Hawaii International Conference on System Sciences, p. 132, 2008, which is hereby incorporated by reference in its entirety) computed precision and recall in two different datasets based on image features and reported the best result among three different classifiers, including an SVM for their second dataset. For the genre of business reports, Kim and Ross report precision and recall for their first dataset of 0.273 and 0.2, respectively. The precision and recall for business reports in Kim and Ross' second dataset was 0.385 and 0.05, respectively.

Based on the description in Kim and Ross (2007) and Kim and Ross (2008), an image classifier using a 62×62 grid was implemented, and each region with at least one pixel with a value less than 245 was assigned a value of '0' and other regions were assigned a value of "1." Two versions of the Weka Naïve Bayes classifier referenced in Kim and Ross (2007) were run on the dataset. The two versions were: (1) plain and (2) with kernel density estimation. For comparative evaluation, we computed F1, the harmonic mean of precision and recall often used in information retrieval (IR):

$$F1 = \frac{2 * \text{precision} * \text{recall}}{\text{precision} + \text{recall}}$$

Figure 13:
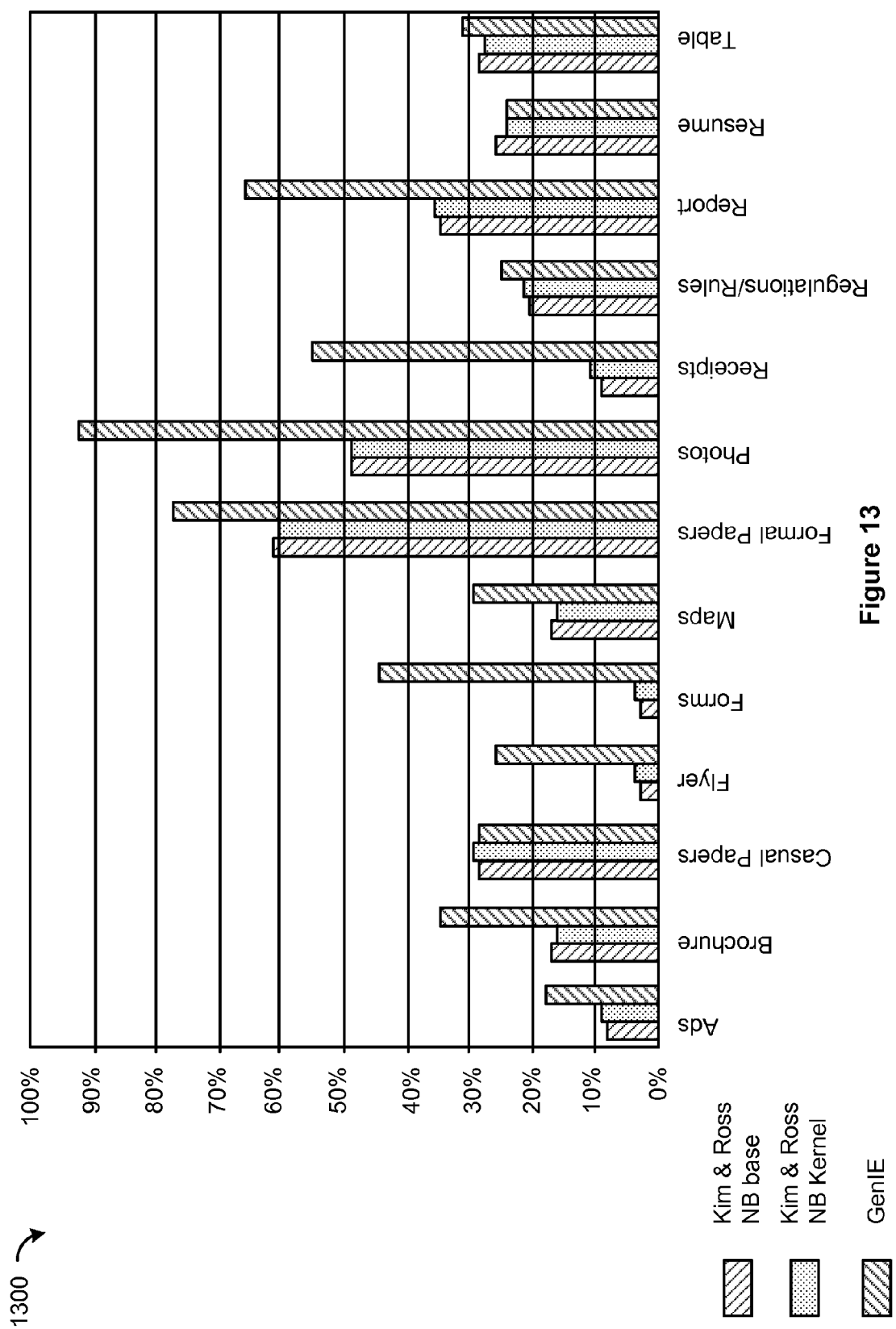
FIG. 13 is a graph comparing tiling performance of a classification system, as measured by the F1 score, according to some embodiments.

As can be observed in FIG. 13, the classification system described herein (e.g., labeled "GenIE" in FIG. 13), performed better overall for the different categories. On average, F1 for GenIE was 0.19 greater than either of our implementations of the Kim and Ross systems.

A second corpus of pages labeled with zero or more of five genres was created. The five genres included a brochure genre, a map genre, a paper genre, a photo genre, and a table genre. Over 3000 pages and approximately 2000 labels were used. The corpus was split into three partitions with an approximately equal number of documents in each partition.

Figure 14:
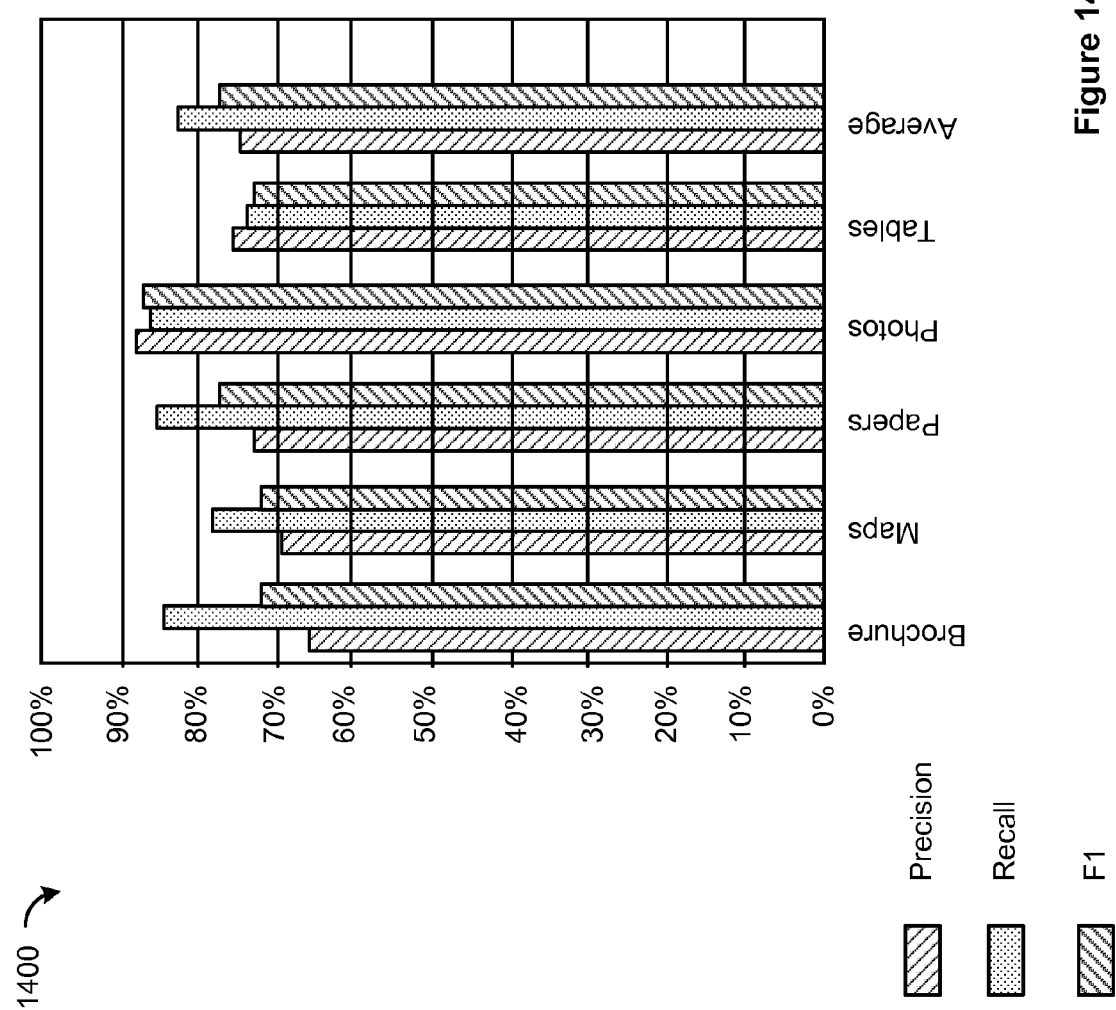
FIG. 14 is another graph illustrating the accuracy, precision, and recall of a classification system, according to some embodiments.

FIG. 14 is another graph illustrating the accuracy, precision, and recall of a classification system, according to some embodiments. In FIG. 14, the performance of a single SVM classifier system for the five genres and the average performance over the five genres, with equal weight given to each genre is plotted. The performance is measured as precision, recall, and F1.

Figure 15:
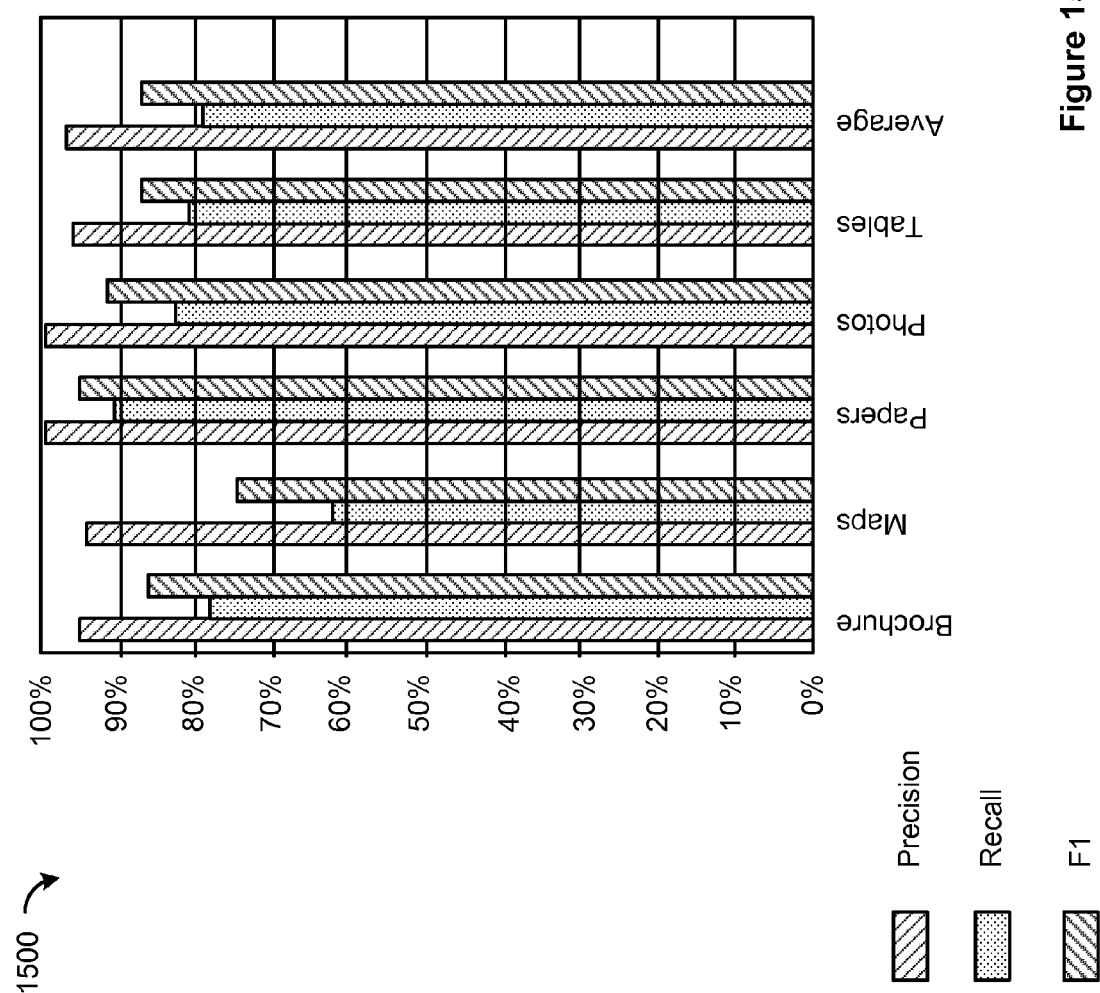
FIG. 15 is another graph illustrating the accuracy, precision, and recall of a classification system, according to some embodiments.

FIG. 15 is another graph illustrating the accuracy, precision, and recall of a classification system, according to some embodiments. In FIG. 15, the performance of the third classification technique that combines the output from two independently trained SVMs (e.g., as described with respect to FIGS. 2C, 3C, 4C, 5E, and 5F) for the same data as used in FIG. 14 is plotted. The precision is above 90% for all genres and close to 100% for the paper and photo genres. The overall precision and recall have increased over the baseline single SVM classifier system.

In some embodiments, for higher precision, a plurality of random partitions is created, pairs of classifiers trained and tuned on each partition, and the classification or decision function scores from the different partitions combined to identify one or more genres.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for generating genre models used to identify genres of a document, comprising:
   on a computer system having one or more processors executing one or more programs stored on memory of the computer system:
   for each document image in a set of document images that are associated with one or more genres,
     segmenting the document image into a plurality of tiles, wherein the tiles in the plurality of tiles are sized so that document page features are identifiable; and
     computing features of the document image and the plurality of tiles; and
   training at least one genre classifier to classify document images as being associated with one or more genres based on the features of the document images in the set of document images, the features of the plurality of tiles of the set of documents images, and the one or more genres associated with each document image in the set of documents images, wherein training the at least one genre classifier to classify document images as being associated with a respective genre in the one or more genres includes:
     training a first genre classifier corresponding to the respective genre based on the features of a first subset of the set of document images and the features of the plurality of tiles associated with the first subset of the set of document images;
     tuning parameters of the first genre classifier using a second subset of the set of document images, wherein the first subset and the second subset of the set of document images are mutually-exclusive sets of document images;
     training a second genre classifier corresponding to the respective genre based on the features of a second subset of the set of document images and the features of the plurality of tiles associated with the second subset of the set of document images; and
     tuning parameters of the second genre classifier using the first subset of the set of document images.

2. A computer-implemented method for generating genre models used to identify genres of a document, comprising:
   on a computer system having one or more processors executing one or more programs stored on memory of the computer system:
   for each document image in a set of document images that are associated with one or more genres,
     segmenting the document image into a plurality of tiles, wherein the tiles in the plurality of tiles are sized so that document page features are identifiable; and
     computing features of the document image and the plurality of tiles; and
   training at least one genre classifier to classify document images as being associated with one or more genres based on the features of the document images in the set of document images, the features of the plurality of tiles of the set of documents images, and the one or more genres associated with each document image in the set of documents images, wherein training the at least one genre classifier to classify document images as being associated with a respective genre in the one or more genres includes:
     for each genre in at least a subset of genres associated with the document images in the set of document images,
       selecting a subset of tiles from the set of document images, wherein each tile in the subset of tiles is associated with the genre; and
       clustering tiles in the subset of tiles based on the features of the tiles; and
       generating a probability model for the genre, wherein the probability model for the genre indicates a likelihood that a respective feature of a respective tile is a member of a cluster of the genre, wherein the probability model is included in a set of probability models, each of which corresponds to a genre in the subset of genres;
     for at least a subset of document images in the set of document images, applying probability models to the subset of document images and the plurality of tiles associated with the subset of document images to produce a set of probabilities that respective document images in the subset of document images are members of one or more genres; and
     training the respective genre classifier to classify a respective document image as being associated with the respective genre based on the set of probabilities and the one or more genres associated with each document image in the subset of document images.

3. The computer-implemented method of claim 1, wherein a subset of the document images are associated with a document that includes multiple pages, and wherein the method is performed on each page of the document.

4. The computer-implemented method of claim 1, wherein the features include:
   document page features; and
   tile features.

5. The computer-implemented method of claim 4, wherein the document page features include one or more of:
- the number of columns of a respective page;
- the number of horizontal lines of the respective page;
- the number of vertical lines of the respective page;
- a histogram of horizontal line lengths of the respective page;
- a histogram of vertical line lengths of the respective page;
- a page size of the respective page; and
- the number of pages of a document.

6. The computer-implemented method of claim 4, wherein the tile features include one or more of:
- a density of a respective tile;
- a number of rows of text of the respective tile;
- an average font size of text of the respective tile;
- a median font size of text of the respective tile;
- a histogram of row widths of the respective tile;
- a subset of values from a color correlogram of the respective tile; and
- an physical location of the respective tile in a document image.

7. The computer-implemented method of claim 1, wherein the plurality of tiles are arranged in a predetermined order.

8. The computer-implemented method of claim 1, wherein segmenting the document image into the plurality of tiles includes segmenting the document image into a specified number of tiles of a specified uniform dimension, wherein the specified uniform dimension is selected so that features of the tiles are exhibited.

9. The computer-implemented method of claim 8, wherein the specified number of tiles is twenty-five.

10. The computer-implemented method of claim 1, wherein a respective genre classifier is a trained support vector machine (SVM).

11. A computer readable storage medium storing one or more programs configured for execution by a computer, the one or more programs comprising instructions to:
for each document image in a set of document images that are associated with one or more genres,
- segment the document image into a plurality of tiles, wherein the tiles in the plurality of tiles are sized so that document page features are identifiable; and
- compute features of the document image and the plurality of tiles; and
train at least one genre classifier to classify document images as being associated with one or more genres based on the features of the document images in the set of document images, the features of the plurality of tiles of the set of documents images, and the one or more genres associated with each document image in the set of documents images, wherein the instructions to train the at least one genre classifier to classify document images as being associated with a respective genre in the one or more genres include instructions to:
- train a first genre classifier corresponding to the respective genre based on the features of a first subset of the set of document images and the features of the plurality of tiles associated with the first subset of the set of document images;
- tune parameters of the first genre classifier using a second subset of the set of document images, wherein the first subset and the second subset of the set of document images are mutually-exclusive sets of document images;
- train a second genre classifier corresponding to the respective genre based on the features of a second subset of the set of document images and the features of the plurality of tiles associated with the second subset of the set of document images; and
- tune parameters of the second genre classifier using the first subset of the set of document images.

12. A computer-implemented method for identifying genres of a document, comprising:
on a computer system having one or more processors executing one or more programs stored on memory of the computer system:
- receiving a document image of the document;
- segmenting the document image into a plurality of tiles of the document image, wherein the tiles in the plurality of tiles are sized so that document page features are identifiable;
- computing features of the document image and the plurality of tiles; and
- identifying one or more genres associated with the document image based on the features of the document image and the features of the plurality of tiles, wherein identifying the one or more genres associated with the document image based on the features of the document image and the features of the plurality of tiles of the document image includes:
  - applying a first set of genre classifiers to the features of the document image and the features of the plurality of tiles associated with the document image to produce a first set of scores, wherein the first set of genre classifiers is trained based on a first subset of training document images, and wherein parameters of the first set of genre classifiers are tuned based on a second subset of the training document images;
  - applying a second set of genre classifiers to the features of the document image and the plurality of tiles associated with the document image to produce a second set of scores, wherein the second set of genre classifiers is trained based on the second subset of the training document images and
  - wherein parameters of the second set of genre classifiers are tuned based on the first subset of the training document images;
  - combining the first set of scores and the second set of scores to produce a combined set of scores; and
  - identifying the one or more genres associated with the document image based on the combined set of scores.

13. The computer-implemented method of claim 12, wherein the first and second sets of genre classifiers are generated during a training phase.

14. The computer-implemented method of claim 12, wherein the first and second sets of genre classifiers are trained support vector machines (SVMs).

15. The computer-implemented method of claim 12, wherein segmenting the document image into the plurality of tiles includes segmenting the document image into a specified number of tiles of a specified uniform dimension, wherein the specified uniform dimension is selected so that features of the tiles are exhibited.

16. The computer-implemented method of claim 15, wherein the specified number of tiles is twenty-five.

17. The computer-implemented method of claim 12, wherein receiving the document image include receiving the document image from an imaging device selected from the group consisting of:
- a copier;
- a scanner;
- a facsimile machine;
- a digital camera;
- a camcorder; and
- a mobile phone.

18. The computer-implemented method of claim 12, including displaying content associated with the one or more genres associated with the document.

19. A computer readable storage medium storing one or more programs configured for execution by a computer, the one or more programs comprising instructions to:
receive a document image of the document;
segment the document image into a plurality of tiles of the document image, wherein the tiles in the plurality of tiles are sized so that document page features are identifiable;
compute features of the document image and the plurality of tiles of the document image; and
identify one or more genres associated with the document image based on the features of the document image and the features of the plurality of tiles of the document image, wherein the instructions to identify the one or more genres associated with the document image based on the features of the document image and the features of the plurality of tiles of the document image include instructions to:
apply a first set of genre classifiers to the features of the document image and the features of the plurality of tiles associated with the document image to produce a first set of scores, wherein the first set of genre classifiers is trained based on a first subset of training document images, and wherein parameters of the first set of genre classifiers are tuned based on a second subset of the training document images;
apply a second set of genre classifiers to the features of the document image and the plurality of tiles associated with the document image to produce a second set of scores, wherein the second set of genre classifiers is trained based on the second subset of the training document images, and wherein parameters of the second set of genre classifiers are tuned based on the first subset of the training document images;
combine the first set of scores and the second set of scores to produce a combined set of scores; and
identify the one or more genres associated with the document image based on the combined set of scores.

20. An imaging system, comprising:
one or more processors;
memory; and
one or more programs stored in the memory, the one or more programs comprising instructions to:
receive a document image of a document;
segment the document image into a plurality of tiles of the document image, wherein the tiles in the plurality of tiles are sized so that document page features are identifiable;
compute features of the document image and the plurality of tiles of the document image; and
identify one or more genres associated with the document image based on the features of the document image and the features of the plurality of tiles of the document image, wherein the instructions to identify the one or more genres associated with the document image based on the features of the document image and the features of the plurality of tiles of the document image include instructions to:
apply a first set of genre classifiers to the features of the document image and the features of the plurality of tiles associated with the document image to produce a first set of scores, wherein the first set of genre classifiers is trained based on a first subset of training document images, and wherein parameters of the first set of genre classifiers are tuned based on a second subset of the training document images;
apply a second set of genre classifiers to the features of the document image and the plurality of tiles associated with the document image to produce a second set of scores, wherein the second set of genre classifiers is trained based on the second subset of the training document images, and wherein parameters of the second set of genre classifiers are tuned based on the first subset of the training document images;
combine the first set of scores and the second set of scores to produce a combined set of scores; and
identify the one or more genres associated with the document image based on the combined set of scores.

21. The imaging system of claim 20, including an imaging device configured to produce the document image from the document.

22. The imaging system of claim 21, wherein the imaging device is selected from the group consisting of:
a copier;
a scanner;
a facsimile machine;
a digital camera;
a camcorder; and
a mobile phone.

23. The imaging system of claim 20, including a display device configured to display content associated with the one or more genres associated with the document.

* * * * *

UNITED STATES PATENT AND TRADEMARK OFFICE
CERTIFICATE OF CORRECTION

PATENT NO.        : 8,260,062 B2
APPLICATION NO.   : 12/437526
DATED             : September 4, 2012
INVENTOR(S)       : Chen et al.

It is certified that error appears in the above-identified patent and that said Letters Patent is hereby corrected as shown below:

In Column 25, line 20, please delete "an physical" and add -- a physical --;

In Column 26, line 59, please delete "include" and add -- includes --.

Signed and Sealed this
Twenty-third Day of October, 2012

David J. Kappos
*Director of the United States Patent and Trademark Office*